United States Patent
Kleinow et al.

(10) Patent No.: US 9,163,519 B2
(45) Date of Patent: Oct. 20, 2015

(54) CAP FOR CERAMIC BLADE TIP SHROUD

(75) Inventors: Chad Daniel Kleinow, Cincinnati, OH (US); John Peter Heyward, Loveland, OH (US); Michael Joseph Danowski, Montgomery, OH (US); Joshua Tyler Mook, Loveland, OH (US); Michael George Abbott, Jupiter, FL (US)

(73) Assignee: General Electric Company, Schenectady, NY (US)

( * ) Notice: Subject to any disclaimer, the term of this patent is extended or adjusted under 35 U.S.C. 154(b) by 877 days.

(21) Appl. No.: 13/192,965

(22) Filed: Jul. 28, 2011

(65) Prior Publication Data

US 2013/0028741 A1 Jan. 31, 2013

(51) Int. Cl.
*F01D 5/22* (2006.01)
*F01D 11/08* (2006.01)
*F01D 5/28* (2006.01)
*F01D 11/12* (2006.01)

(52) U.S. Cl.
CPC ........... *F01D 5/225* (2013.01); *F01D 5/28* (2013.01); *F01D 11/08* (2013.01); *F01D 11/127* (2013.01)

(58) Field of Classification Search
CPC ............. F01D 5/22; F01D 5/28; F01D 5/282; F01D 5/284; F01D 11/08; F01D 11/12; F01D 11/122; F01D 11/127
USPC ............... 416/62, 189, 190, 191, 192, 241 R, 416/241 B; 415/173.6
See application file for complete search history.

(56) References Cited

U.S. PATENT DOCUMENTS

| | | | |
|---|---|---|---|
| 3,053,505 A * | 9/1962 | Welsh | 416/192 |
| 3,576,377 A * | 4/1971 | Beanland et al. | 416/191 |
| 4,017,209 A | 4/1977 | Bodman | |
| 4,111,603 A * | 9/1978 | Stahl | 416/95 |
| 5,211,540 A | 5/1993 | Evans | |
| 6,241,471 B1 | 6/2001 | Herron | |
| 6,254,345 B1 | 7/2001 | Harris et al. | |
| 6,926,495 B2 * | 8/2005 | Diakunchak | 415/173.3 |
| 7,001,152 B2 | 2/2006 | Paquet et al. | |
| 7,066,714 B2 | 6/2006 | Miller et al. | |
| 7,326,030 B2 * | 2/2008 | Albrecht et al. | 415/115 |
| 7,393,182 B2 | 7/2008 | Matheny | |
| 7,527,477 B2 | 5/2009 | Norton et al. | |
| 7,686,568 B2 | 3/2010 | Moors et al. | |
| 7,771,171 B2 | 8/2010 | Mohr et al. | |
| 2005/0191182 A1 * | 9/2005 | Seleski | 416/192 |
| 2008/0038116 A1 | 2/2008 | Zemitis et al. | |
| 2009/0123268 A1 * | 5/2009 | Brittingham et al. | 415/115 |
| 2009/0180896 A1 | 7/2009 | Brittingham | |
| 2009/0202355 A1 * | 8/2009 | Dierksmeier et al. | 416/226 |

* cited by examiner

*Primary Examiner* — Edward Look
*Assistant Examiner* — Danielle M Christensen
(74) *Attorney, Agent, or Firm* — General Electric Company; William Scott Andes

(57) ABSTRACT

A ceramic shroud assembly includes a tip shroud having an outer platform supporting at least one seal tooth, a shroud cap less brittle than the outer platform and including a shroud cap base on the outer platform, and clockwise and counter-clockwise facing clockwise and counter-clockwise contact surfaces located at clockwise and counter-clockwise distal ends respectively of the base. A rotor assembly may include a circumferential row of turbine blades made of a ceramic material and extending radially outwardly from a disk of a turbine rotor. The turbine blades include airfoils having the airfoil tip shrouds and the shroud caps at blade tips. The clockwise and counter-clockwise contact surfaces of circumferentially adjacent ones of the shroud caps contact each other. The shroud and the platform may be made of a ceramic or ceramic matrix composite material and the shroud cap may be made of a metallic material.

56 Claims, 15 Drawing Sheets

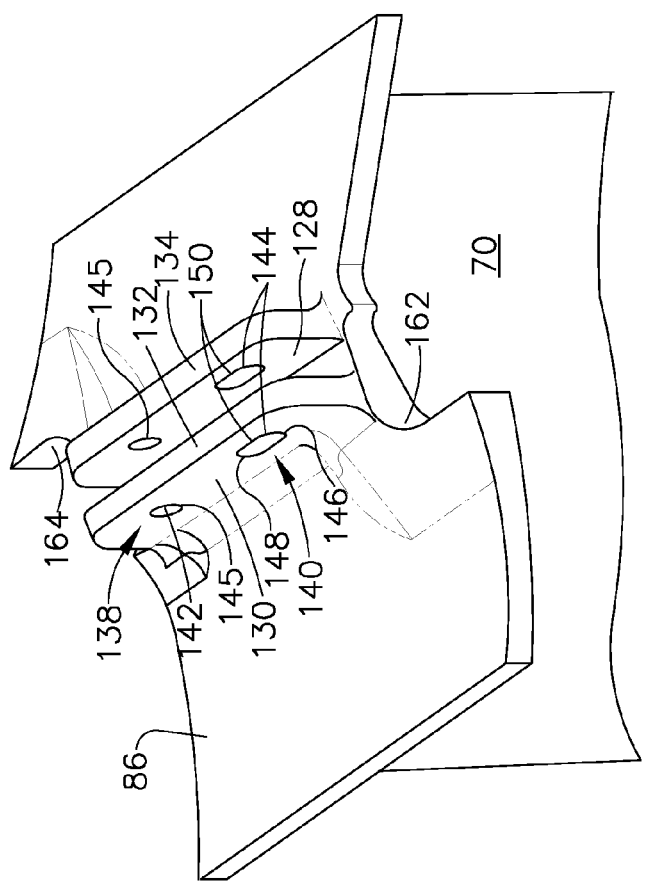
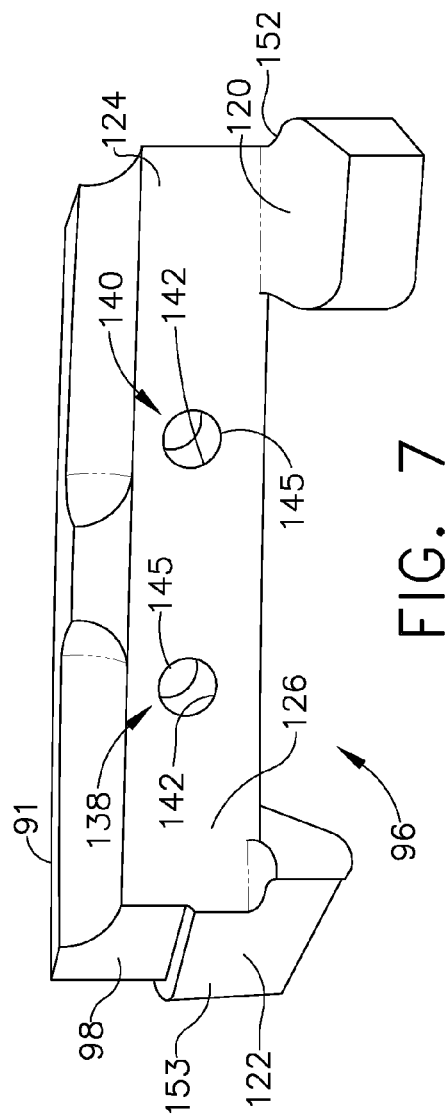
FIG. 6
FIG. 7

CAP FOR CERAMIC BLADE TIP SHROUD

BACKGROUND OF THE INVENTION

1. Technical Field

The present invention relates generally to gas turbine engine turbine blade tip shrouds and, more particularly, to turbine blade tip shrouds for ceramic turbine blades.

2. Background Information

Some gas turbine engines employ blade tip shrouds on individual airfoils to limit blade amplitudes when vibrating due to forced or resonant response and to reduce aerodynamic flow losses and leakage over the tip of the airfoil and to guide fluid flow over the airfoils. This is particularly true in the low pressure section of a gas turbine engine. Neighboring shrouds abut in the circumferential direction to add mechanical stiffness, and provide damping during blade vibration. When a series of such assemblies are mounted together, the tip shrouds define, in effect, a continuous annular surface. Circumferentially opposite edges of the tip shrouds are provided with abutment faces and are designed to provide desired tip constraint at assembly and engine operating conditions.

Annular seal teeth extend radially outwardly from the shrouds to engage seal lands to seal the gas flowpath between the tip shrouds and casing surrounding the rotor. The seal lands typically are in the form of a honeycomb covered stator shroud. It is known to use ceramic or ceramic matrix composite (CMC) materials for turbine airfoils.

It is known that light weight, uncooled, high temperature capability, ceramic matrix composite (CMC) airfoils may be used for turbine blades in the low pressure turbine. Ceramic and ceramic matrix composite (CMC) materials are low strain to failure materials. One ceramic matrix composite material suitable for turbine blades is a SiC—SiC CMC, a silicon infiltrated silicon carbide composite reinforced with coated silicon carbide fibers. CMC's are an attractive alternate material to Nickel based superalloy low pressure (LPT) blades because of their high temperature capability and light weight. These characteristics provide opportunities for cooling flow savings as compared to cooled LPT blades. This also provides possible improvement in design optimization of disks which support LPT blades.

Design challenges posed by CMC LPT blades include low thermal coefficient of expansion, low strain to failure, and relatively poor wear characteristics. The low thermal coefficient of expansion results in smaller growth of the tip shroud in the tangential direction during operation relative to metal blades. The impact of this is a reduction and possible loss of interlock load between adjacent blade tip shrouds which may also be a potential HCF issue and an increase in leakage area around the tip shrouds perimeter which is a performance issue.

Due to the brittle nature and lack of damage tolerance of CMC's compared to metals, the material is very susceptible to chipping, cracking, and impact damage. For these reasons, CMC on CMC contact at the interlock faces of the blade tip shrouds is a design concern. The main concern is loss of material and reduction and possible loss of interlock load. The poor wear characteristics are an issue with regards to the rotating seal teeth cutting the static shroud honeycomb and the relative motion of interlock surfaces on adjacent LPT blade tip shrouds.

The impact of wear on the seal teeth can increase environmental degradation resulting in an excessively large leakage path between the seal teeth and the shroud which lowers overall engine performance and fuel efficiency. It can also result in fraying of CMC plies which is a durability issue. The impact of excessive wear on the interlock surface could be a loss of interlock load resulting in an undamped airfoil prone to forced or resonant response.

Accordingly, it is desirable to have a CMC LPT blade and blade tip shroud designs which lower or prevent loss of CMC material and prevent reduction and possible loss of interlock load between adjacent blade tip shrouds, and possible sealing issues.

BRIEF DESCRIPTION OF THE INVENTION

A gas turbine engine blade shroud assembly includes a ceramic airfoil tip shroud having a circumferentially extending outer platform, at least one seal tooth supported by and extending radially outwardly away from and circumferentially parallel to a radially outwardly facing outer shroud surface of the outer platform, a shroud cap supported on the outer platform, the shroud cap being less brittle than the outer platform, the shroud cap including a horizontally or circumferentially extending shroud cap base having horizontally or circumferentially spaced apart clockwise and counter-clockwise distal ends, and clockwise and counter-clockwise forward and aft contact surfaces located at the clockwise and counter-clockwise distal ends respectively.

The ceramic airfoil tip shroud and the outer platform may be made of a ceramic or a ceramic matrix composite material and the shroud cap may be made of a metallic material. The seal tooth may be integral with or integrally formed with the shroud cap base.

The clockwise contact surface may be forward facing and the counter-clockwise contact surface may be aft facing. The clockwise and counter-clockwise contact surfaces may be flat and angled at clockwise and counter-clockwise angles respectively with respect to a circumferentially extending base centerline of the shroud cap base.

The clockwise and counter-clockwise contact surfaces may be located on horizontally or circumferentially spaced apart clockwise and counter-clockwise side legs at the clockwise and counter-clockwise distal ends respectively of the shroud cap base.

The shroud cap base may be disposed in a slot of a bracket extending radially outwardly from the outer platform of the tip shroud, the shroud cap base may be disposed between radially outwardly extending forward and aft flanges of the bracket, and the bracket and the tip shroud may be made of the same composite material such as a ceramic matrix composite. Cylindrical pins may be disposed through horizontally or circumferentially spaced apart first and second sets of axially aligned holes in the forward and aft flanges and the shroud cap base therebetween. The first set of the holes have circular cross-section holes disposed through the shroud cap base, non-circular cross-section holes of the second set of the holes are disposed through the forward and aft flanges, and each of the non-circular cross-section holes has a cross-sectional racetrack shape with semi-circular horizontally or circumferentially spaced apart first and second ends and a rectangular middle section therebetween.

The shroud cap may be a dual tooth shroud cap and the shroud cap base a dual tooth shroud cap base integral or integrally formed with the dual tooth shroud cap. The dual tooth shroud cap includes axially spaced apart forward and aft seal teeth supported by and extending radially outwardly away from the dual tooth shroud cap and the axially spaced apart forward and aft seal teeth extend circumferentially parallel to a radially outwardly facing outer shroud surface of the outer platform. The dual tooth shroud cap base extends radially outwardly from the dual tooth shroud cap. A center flange integral with the outer platform extends radially outwardly from the outer shroud surface of the outer platform through a horizontally or circumferentially extending elongated rectangular slot in the dual tooth shroud cap base.

The shroud cap base may be disposed between forward and aft half flanges extending radially outwardly from the outer platform of the tip shroud. The forward and aft half flanges include mortises of clockwise and counter-clockwise bridle joints near clockwise and counter-clockwise facing shroud side edges of the shroud assembly respectively. Tenons of the clockwise and counter-clockwise bridle joints axially extend from the clockwise and counter-clockwise distal ends of the shroud cap base and are received within the mortises. The shroud cap may include clockwise and counter-clockwise sections joined along a seam therebetween.

Another shroud assembly may include only a single seal tooth extending radially outwardly from the shroud cap base and a horizontally or circumferentially extending elongated rectangular cavity extending radially outwardly from an underside of and partially through the shroud cap base. A center flange extending radially outwardly from the outer shroud surface of the outer platform is received within the cavity and the center flange is integral with the outer platform.

The outer platform may be a dual tooth outer platform having axially spaced apart forward and aft seal teeth integral with and extending radially outwardly from the dual tooth outer platform.

In another embodiment of the shroud assembly the outer platform includes forward and aft sections with a slot therebetween. The shroud cap base is at least partially disposed in the slot and extends radially outwardly from the outer platform of the tip shroud. Forward and aft corners on the aft and forward sections respectively border the slot therebetween. Clockwise and counter-clockwise end lap joints are located near the clockwise and counter-clockwise facing shroud side edges of the shroud assembly respectively. One of the forward corners and one of the aft corners each include a platform cheek and a platform shoulder of the clockwise and counter-clockwise end lap joints. The clockwise and counter-clockwise side legs include axially extending clockwise and counter-clockwise flanges respectively. Each of the clockwise and counter-clockwise flanges include a shroud cap cheek and a shroud cap shoulder of the clockwise and counter-clockwise end lap joints respectively. The platform cheeks directly contact and press against the shroud cap cheeks of the respective clockwise and counter-clockwise end lap joints. The platform cheeks butt up against the shroud cap shoulders of the respective clockwise and counter-clockwise end lap joints. The shroud cap cheeks butt up against the platform shoulders of the respective clockwise and counter-clockwise end lap joints. The shroud cap may include clockwise and counter-clockwise sections joined along a seam therebetween.

Another shroud assembly includes forward and aft cap flanges extending axially forwardly and aftwardly respectively from and oriented perpendicular to the shroud cap base. Forward and aft ceramic flanges extend radially outwardly from and are integral with the outer platform of the tip shroud and are oriented perpendicular to the shroud cap base. The forward and aft ceramic flanges are flush against and parallel to the forward and aft cap flanges respectively.

A gas turbine engine blade turbine blade made of a ceramic material includes an airfoil having pressure and suction sides extending radially outwardly from an inner platform to a blade tip and a ceramic airfoil tip shroud at the blade tip. The tip shroud includes a circumferentially extending outer platform and a shroud cap supported on the outer platform. The shroud cap is less brittle than the outer platform and includes a horizontally or circumferentially extending shroud cap base with horizontally or circumferentially spaced apart clockwise and counter-clockwise distal ends respectively.

A gas turbine engine turbine rotor assembly includes a circumferential row of turbine blades made of a ceramic material and extending radially outwardly from a disk of a turbine rotor. The turbine blades include airfoils having pressure and suction sides extending radially outwardly from inner platforms to blade tips and airfoil tip shrouds at the blade tips. The tip shrouds include circumferentially extending outer platforms and at least one seal tooth is supported by and extending radially outwardly away from and circumferentially parallel to each of the outer platforms. Shroud caps supported on the outer platforms are less brittle than the outer platforms and each of the shroud caps includes a horizontally or circumferentially extending shroud cap base having horizontally or circumferentially spaced apart clockwise and counter-clockwise distal ends. Clockwise and counter-clockwise facing contact surfaces are located at the clockwise and counter-clockwise distal ends respectively and the clockwise and counter-clockwise contact surfaces of circumferentially adjacent ones of the shroud caps contact each other.

The rotor assembly may further include circumferentially spaced apart clockwise and counter-clockwise facing shroud side edges of the shroud assembly respectively. Each of the clockwise and counter-clockwise facing shroud side edges including convex and concave portions. Each axially adjacent pair of the convex and concave portions along the same clockwise or counter-clockwise facing shroud side edges having a common surface portion, and the convex portions of the clockwise shroud side edges being complimentary and interlocking with the concave portions of circumferentially adjacent ones of the counter-clockwise facing shroud side edges.

The clockwise and counter-clockwise contact surfaces of circumferentially adjacent ones of the shroud caps may contact each other with sufficient force to pretwist the turbine blades.

BRIEF DESCRIPTION OF THE DRAWINGS

FIG. 6 is a perspective view illustration of the low pressure turbine blade tip shroud illustrated in FIG. 4 without the metallic shroud cap.

FIG. 7 is a perspective view illustration of the shroud cap illustrated in FIG. 4.

DETAILED DESCRIPTION OF THE INVENTION

Figure 1:
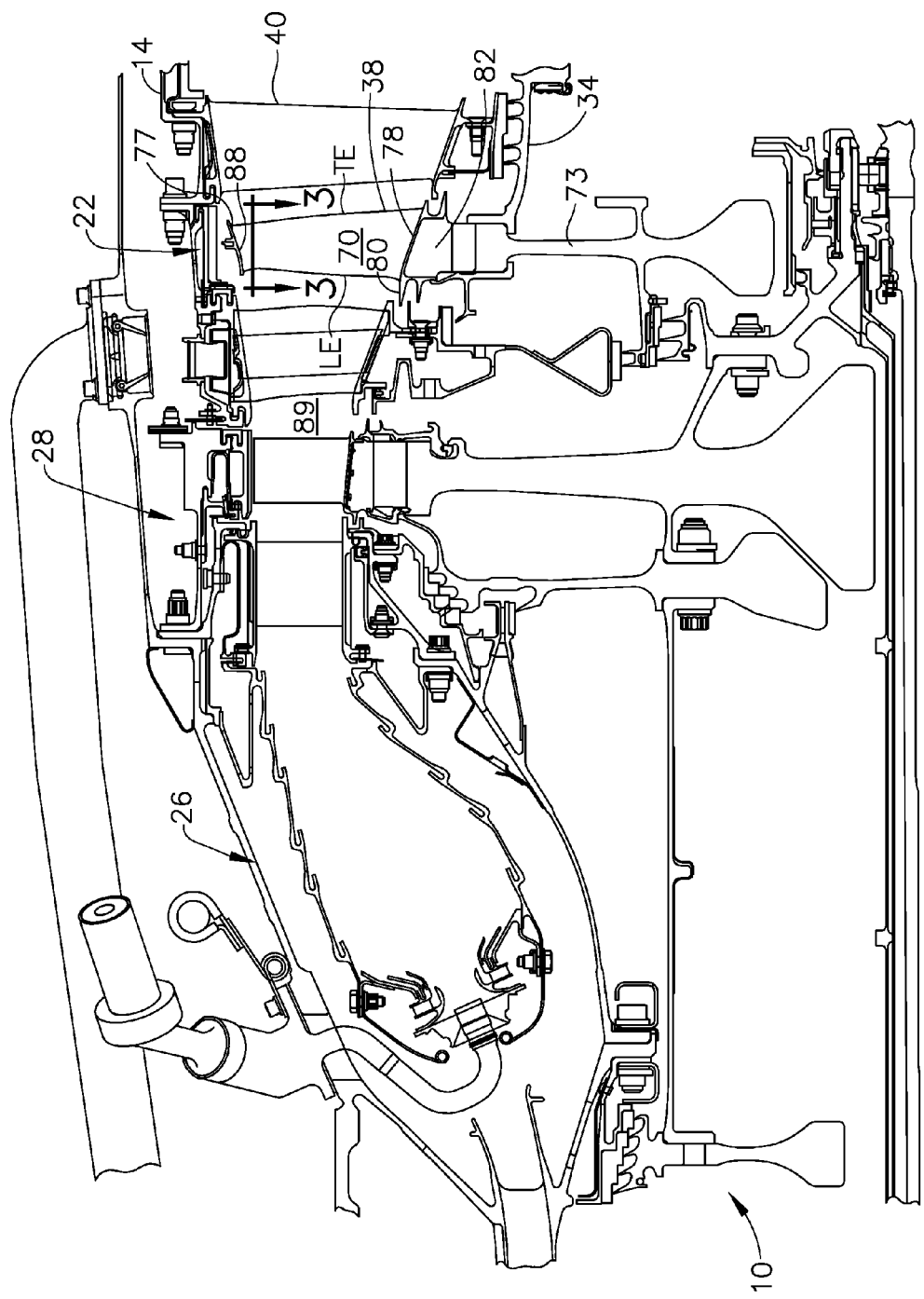
FIG. 1 is a sectional view illustration of a gas turbine engine combustor and a turbine section having a low pressure CMC turbine blade tip with a tip shroud and a metallic shroud cap with a seal tooth.

Illustrated in FIG. 1 are hot sections of a gas turbine engine 10 including in downstream flow relationship, a combustor 26, a high pressure turbine 28 (HPT), and low pressure turbine 22 (LPT). The low pressure turbine 22 includes an annular rotatable low pressure turbine rotor 34. A circumferential row 38 of low pressure turbine blades 70 extending radially outwardly from a disk 73 of the low pressure turbine rotor 34. A row of LPT stator vanes 40 are fixedly attached to and extend radially inwardly from the relatively stationary engine casing 14 downstream and aft of the row 38 of the low pressure turbine blades 70.

Figure 2:
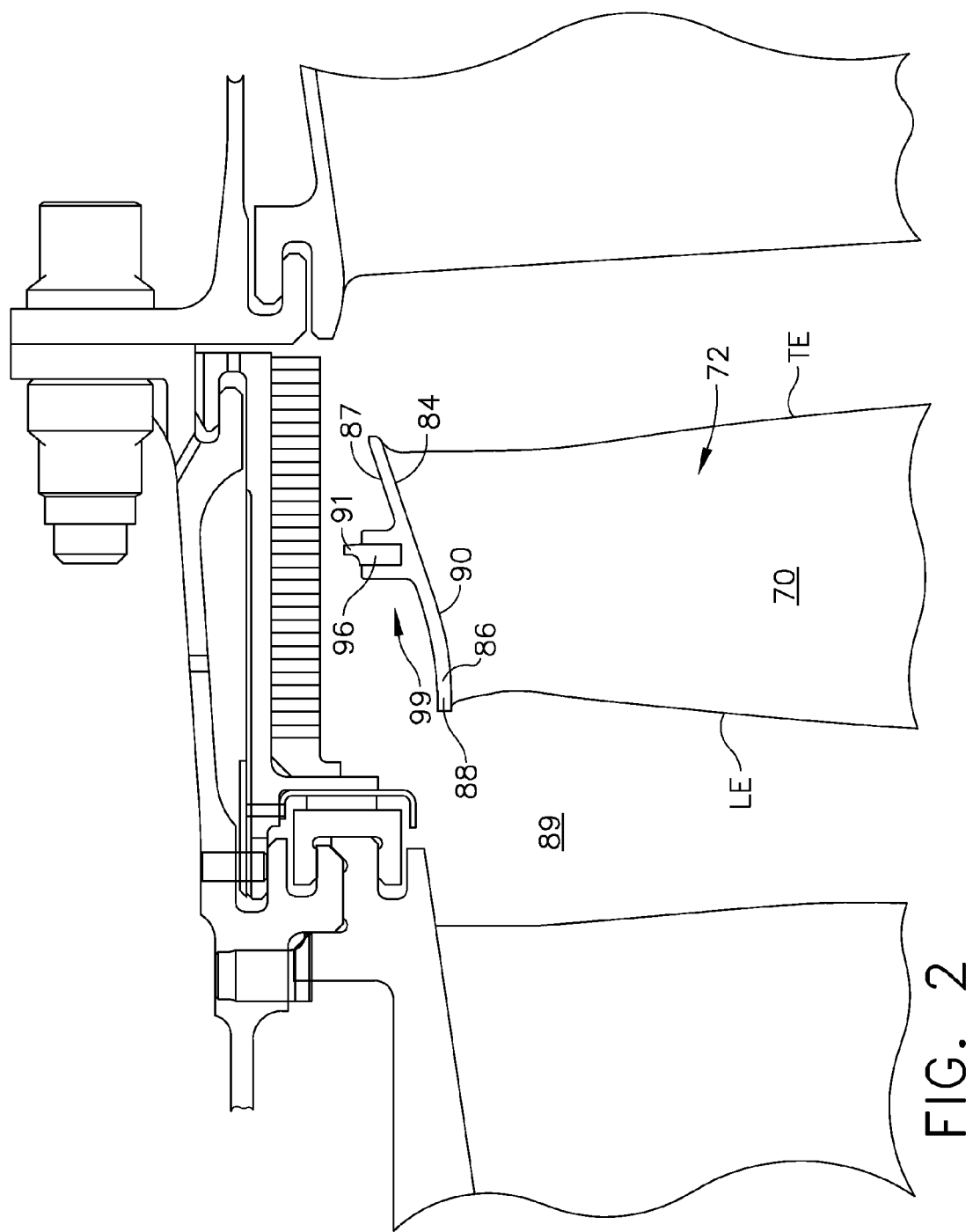
FIG. 2 is an enlarged sectional view illustration of the blade tip, shroud, and metallic shroud cap illustrated in FIG. 1.
Figure 3:
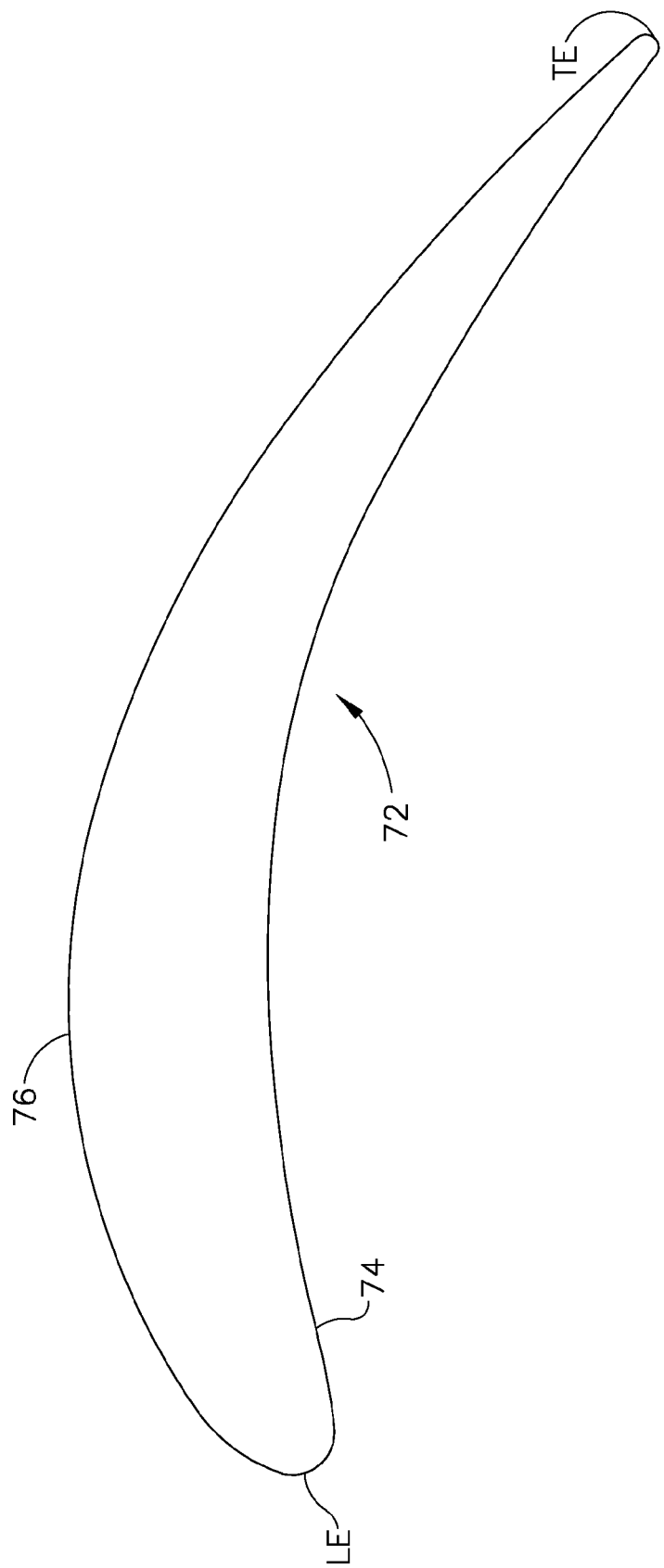
FIG. 3 is a cross-sectional view illustration of an airfoil cross-section through 3-3 of the low pressure turbine blade illustrated in FIG. 1.

The low pressure turbine blades 70 made from a ceramic or ceramic matrix composite (CMC) material and, as further illustrated in FIGS. 1-3, includes an airfoil 72 with pressure and suction sides 74, 76 (FIG. 2). The airfoil 72 extends radially outwardly from an airfoil base 78 to a blade tip 77. The pressure and suction sides 74, 76 extend from the airfoil leading edge LE to the airfoil trailing edge TE. The airfoil 72 extends downstream from an airfoil leading edge LE to an airfoil trailing edge TE. The airfoil 72 extends radially outwardly from an inner platform 80 of the low pressure turbine blade 70. A dovetail root 82 attached to and located radially inwardly of the inner platform 80 is used for rigidly mounting the low pressure turbine blade 70 to the disk 73 of the low pressure turbine rotor 34.

Figure 4:
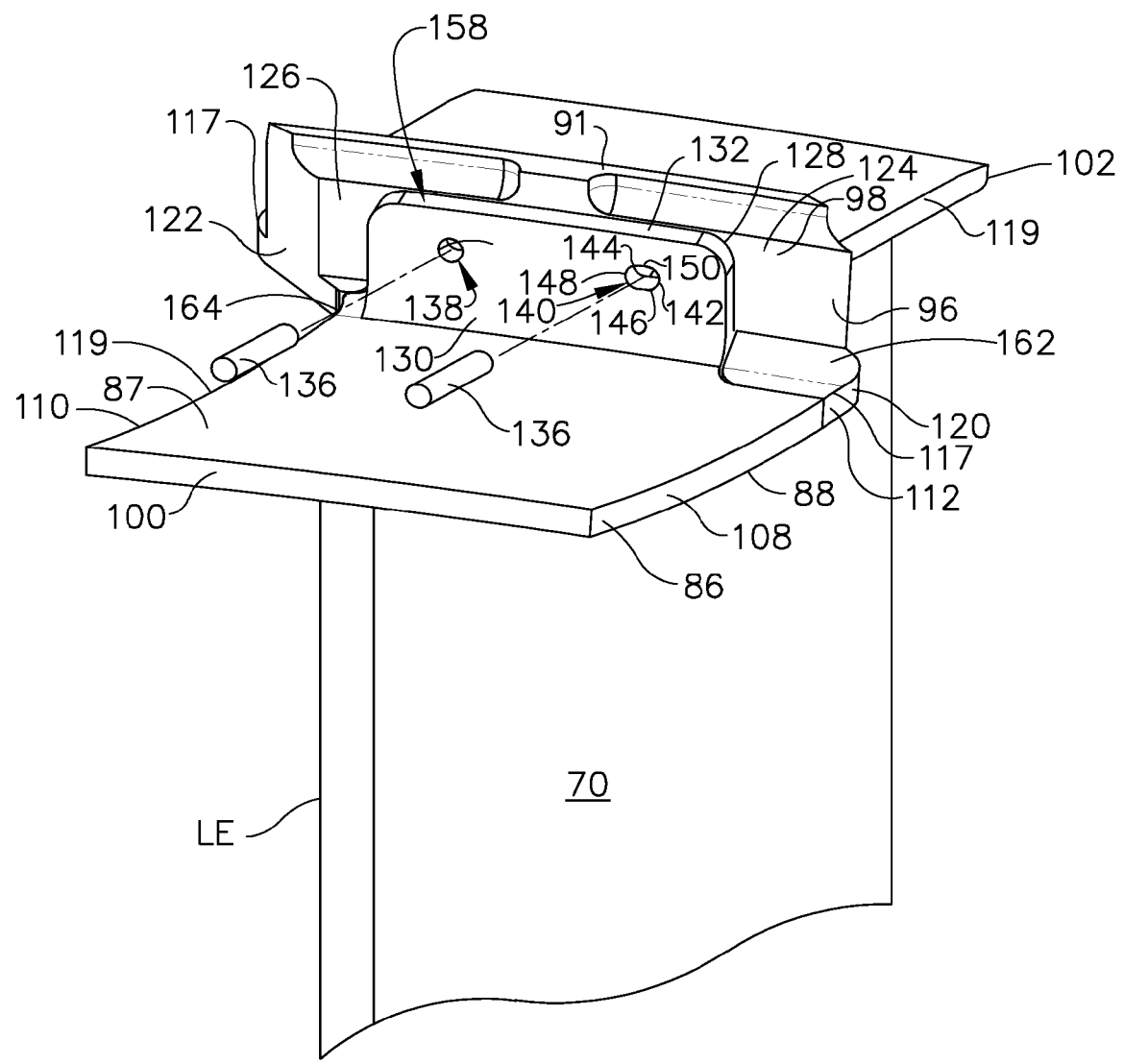
FIG. 4 is a perspective view illustration of the low pressure turbine blade tip shroud and shroud cap supporting a seal tooth illustrated in FIG. 2.

Referring to FIGS. 2, 3 and 4, an outer end portion 84 of the airfoil 72 includes the blade tip 77 which has a cross-sectional airfoil shape and a tip shroud 88. The tip shroud 88 includes a circumferentially extending outer platform 86 having radially inwardly facing tip inner shroud surface 90 which defines a portion of the outer boundary of a turbine gas flowpath 89 for guiding the flow of hot gases therethrough. A seal tooth 91 is supported by and extends radially outwardly away from and circumferentially parallel to a radially outwardly facing outer shroud surface 87 of the outer platform 86 of the tip shroud 88. A shroud assembly 99 includes a shroud cap 96 (illustrated herein as being metallic) supported on the outer platform 86.

Generally, the shroud cap 96 may be made of other materials that are less brittle than the ceramic or ceramic matrix composite (CMC) material of the low pressure turbine blades 70. The exemplary the shroud cap 96 illustrated herein is metallic. Though the blade and shroud assembly and its shroud cap is illustrated herein for use in a low pressure turbine it may be used in other types of turbines.

Referring to FIGS. 2-6, the shroud assembly 99 includes circumferentially extending and axially spaced apart forward and aft shroud edges 100, 102 and circumferentially spaced apart clockwise and counter-clockwise facing shroud side edges 108, 110. Circumferentially adjacent ones 111 of the clockwise and counter-clockwise facing shroud side edges 108, 110 are interlocking and complimentary in shape.

Each of the clockwise and counter-clockwise facing shroud side edges 108, 110 include convex portions 117 and concave portions 119 that may be complimentary in shape. The convex portions 117 and concave portions 119 may be viewed as projections and indentations. Each axially adjacent pair of the respective convex portions 117 and the concave portions 119 along the same clockwise or counter-clockwise facing shroud side edges 108, 110 have a common surface portion 121. The convex portions 117 of the clockwise shroud side edges 108 are complimentary and interlock with the concave portions 119 of circumferentially adjacent counter-clockwise facing shroud side edges 110. The clockwise and counter-clockwise facing shroud side edges 108, 110 of the tip shrouds 88 of circumferentially adjacent turbine blades 70 are interlocking and complimentary in shape.

The outer platform 86 includes forward and aft sections 50, 52. The forward section 50 includes parallel forward clockwise and counter-clockwise facing side edge sections 56, 58. The aft section 52 includes parallel aft clockwise and counter-clockwise facing side edge sections 66, 68. The forward and aft clockwise facing side edge sections 56, 66 are part of the clockwise facing shroud side edge 108. The forward and aft counter-clockwise facing side edge sections 58, 68 are part of the counter-clockwise facing shroud side edge 110.

Figure 5:
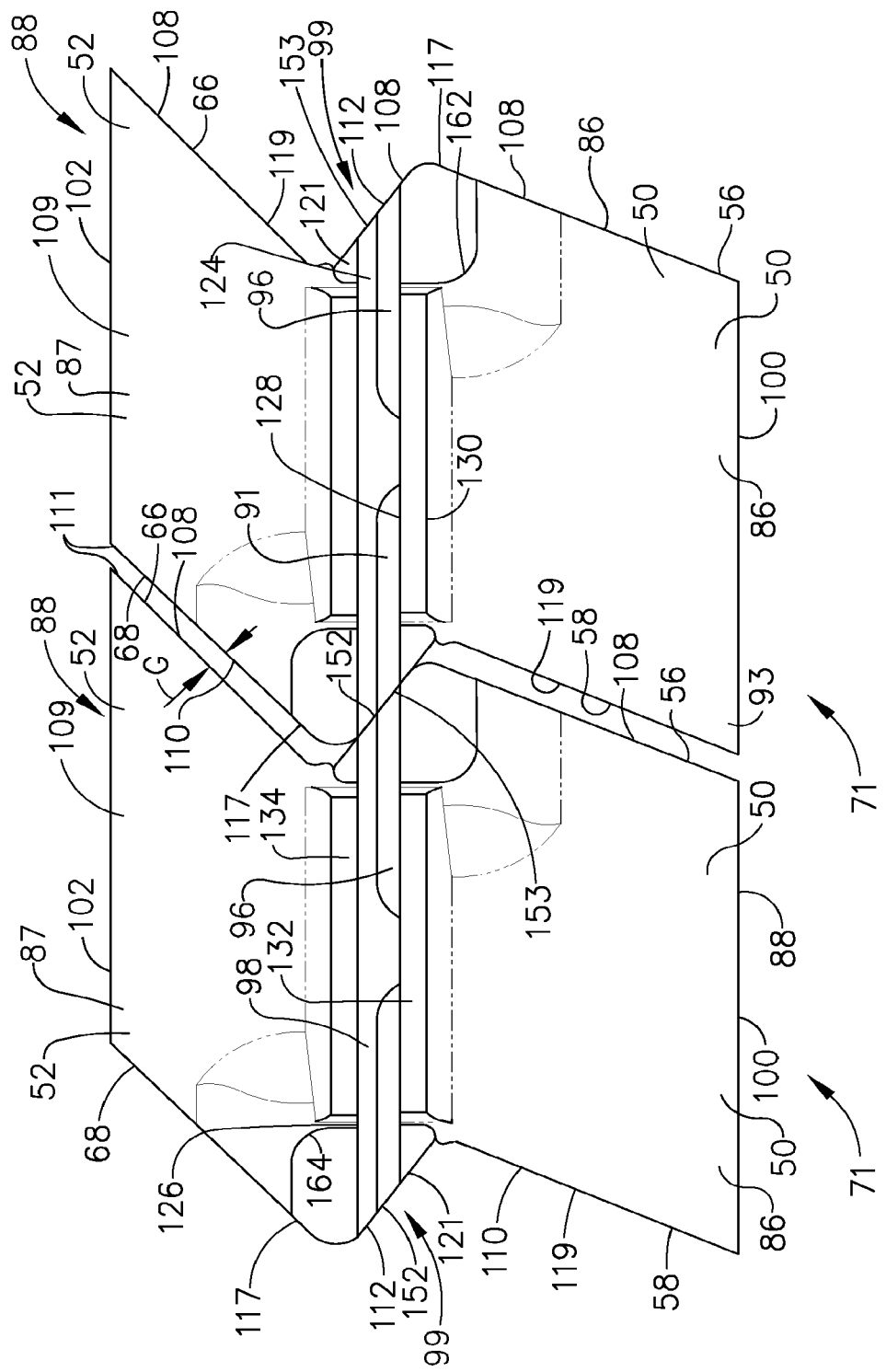
FIG. 5 is a radially inwardly looking view illustration of two circumferentially adjacent low pressure CMC turbine blade tip shrouds having the metallic shroud caps illustrated in FIG. 4.

Referring to FIG. 5, the convex portions 117 on the clockwise facing shroud side edge 108 of each of the outer platforms 86 of tip shrouds 88 are received within the concave portions 119 of the counter-clockwise facing shroud side edge 110 of a circumferentially adjacent tip shroud 93. The convex portions 117 on the counter-clockwise facing shroud side edge 110 of each of the outer platforms 86 are received within the concave portions 119 of the clockwise facing shroud side edge 108 of the circumferentially adjacent tip shroud 93. A gap G is located between clockwise and counter-clockwise facing shroud side edges 108, 110 of circumferentially adjacent tip shrouds 109 when the engine is not operating. The gap G is maintained but may change in size during engine operation.

Figure 8:
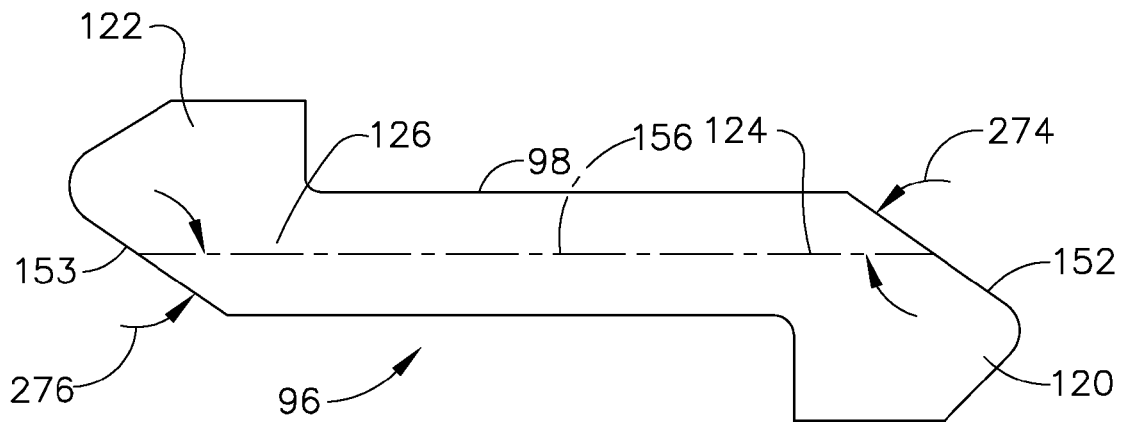
FIG. 8 is a radially inwardly looking view illustration of the shroud cap illustrated in FIG. 4.

The embodiment of the metallic shroud cap 96 illustrated in FIGS. 2, 4, and 7-8, includes the seal tooth 91 extending radially outwardly from and being integral with a horizontally or circumferentially extending shroud cap base 98. Referring particularly to FIGS. 7 and 8, the shroud cap 96 further includes horizontally or circumferentially spaced apart clockwise and counter-clockwise side legs 120, 122 at opposite horizontally or circumferentially spaced apart clockwise and counter-clockwise distal ends 124, 126 respectively of the shroud cap base 98. The clockwise and counter-clockwise side legs 120, 122 extend radially inwardly or downwardly from the clockwise and counter-clockwise distal ends 124, 126 respectively towards the airfoil base 78.

The clockwise and counter-clockwise side legs 120, 122 conform and complete the shape of the convex portions 117 and concave portions 119 of the clockwise and counter-clockwise facing shroud side edges 108, 110 of the shroud assembly 99 as illustrated in FIG. 5. Clockwise and counter-clockwise contact surfaces 152, 153 are disposed at opposite horizontally or circumferentially spaced apart clockwise and counter-clockwise distal ends 124, 126 respectively of the shroud cap base 98. The clockwise and counter-clockwise contact surfaces 152, 153 are clockwise and counter-clockwise facing interlock surfaces and may be referred to herein as clockwise and counter-clockwise facing contact surfaces respectively.

In the exemplary embodiment of the shroud cap base 98 illustrated herein, the clockwise and counter-clockwise contact surfaces 152, 153 are disposed on the clockwise and counter-clockwise side legs 120, 122 respectively. The clockwise contact surfaces 152 are illustrated herein as also facing aft and the counter-clockwise contact surfaces 153 are illustrated herein as also facing forward. Alternatively, the clockwise contact surfaces 152 may also face forward and the counter-clockwise contact surfaces 153 may face aft.

The clockwise and counter-clockwise contact surfaces 152, 153 are angled at clockwise and counter-clockwise angles 274, 276 respectively with respect to a circumferentially extending base centerline 156 of the shroud cap base 98. The exemplary clockwise and counter-clockwise angles 274, 276 illustrated herein are equal in size. The exemplary clockwise and counter-clockwise contact surfaces 152, 153 illustrated herein are flat.

The contact surfaces are also referred to as interlock surfaces. The clockwise and counter-clockwise facing shroud side edges 108, 110 include a common surface strip 112 of the clockwise and counter-clockwise contact surfaces 152, 153 of the clockwise and counter-clockwise side legs 120, 122 respectively which are also illustrated in FIG. 4. The clockwise and counter-clockwise side legs 120, 122 are received within clockwise and counter-clockwise facing notches 162, 164 in the tip shroud 88 as illustrated in FIGS. 4-7.

When the low pressure turbine blade 70 are assembled into the disk 73 of the low pressure turbine rotor 34, the clockwise contact surfaces 152 contact the counter-clockwise contact surfaces 153 of the clockwise and counter-clockwise distal ends 124, 126 respectively of circumferentially adjacent ones 71 of the shroud cap bases 98. The clockwise contact surfaces 152 contact the counter-clockwise contact surfaces 153 with sufficient force to pretwist the turbine blades 70. Pretwist is a rotation of the tip shroud 88 relative to the dovetail root 82 of the turbine blade 70.

The pretwist provides a positive load between the interlock or clockwise and counter-clockwise contact surfaces 152, 153 on circumferentially adjacent tip shrouds 88. The shroud cap 96 maintains the load between interlock surfaces on adjacent blades during engine operation. The shroud cap 96 and its interlock or clockwise and counter-clockwise contact surfaces 152, 153 maintain the correct clearances between non-interlock areas of the tip shroud perimeter, namely the CMC clockwise and counter-clockwise facing shroud side edges 108, 110 of the tip shroud 88.

Referring to FIGS. 4-7, the shroud cap base 98 is disposed in a slot 128 of a bracket 130 extending radially outwardly from the outer platform 86 of the tip shroud 88. The shroud cap base 98 is disposed between radially outwardly extending forward and aft flanges 132, 134 of the bracket 130. The bracket 130 and the forward and aft flanges 132, 134 are made of the same ceramic or ceramic matrix composite (CMC) material as is the rest of the turbine blade 70.

Cylindrical pins 136 are disposed through horizontally or circumferentially spaced apart first and second sets 138, 140 of axially aligned holes 142 in the forward and aft flanges 132, 134 and the shroud cap base 98 therebetween. The metallic shroud cap 96 should be mounted to the CMC tip shroud 88 in such a fashion to be firmly located, but configured so as to not cause excessive stresses due to differential thermal expansion between the CMC tip shroud 88 and the metallic shroud cap 96. The exemplary embodiment of the holes 142 in the first set 138 of holes 142 are all cylindrical with circular cross-sections. The exemplary embodiment of the holes 142 in the second set 140 includes non-circular cross-section holes 141 through the forward and aft flanges 132, 134 and circular cross-section holes 145 through the shroud cap base 98. The exemplary embodiment of the non-circular cross-section holes 141 have a cross-sectional racetrack shape 144 with semi-circular horizontally or circumferentially spaced apart first and second ends 146, 148 and a rectangular middle section 150 therebetween.

The exemplary mounting assembly 158 illustrated in FIGS. 4, 6 and 7 includes tight fitting cylindrical pins 136 in the first set 138 of axially aligned holes 142 that locates the metallic shroud cap 96 circumferentially. Cylindrical pins 136 tightly fitted in the circular holes 145 through the shroud cap base 98 in the second set 140 of holes 142 provides a final radial locating feature when the blades are rotating during engine operation. The racetrack shaped non-circular cross-section holes 141 in the second set 140 of holes 142 help accommodate differential or relative thermal growth between the metal shroud cap 96 and the CMC tip shroud 88. The cylindrical pins 136 may be tightly press fitted or braze welded or otherwise fixedly mounted and attached in the circular holes 145.

Figure 9:
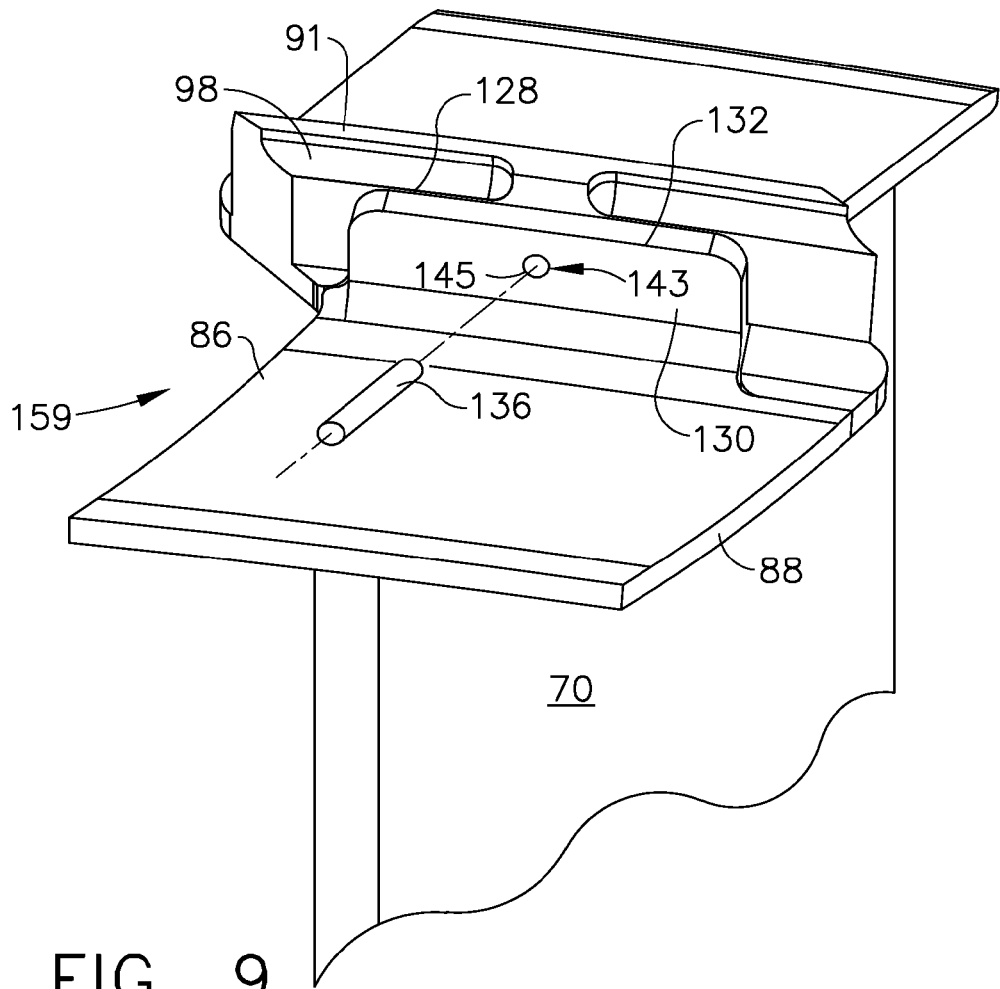
FIG. 9 is a perspective view illustration of the blade tip, shroud, and metallic shroud cap illustrated in FIG. 1 with a single pin holding the seal tooth in the metallic shroud cap.

An alternative mounting assembly 159 illustrated in FIG. 9 provides only a single cylindrical pin 136 disposed through only a single set 143 of holes 142 in the forward and aft flanges 132, 134 and the shroud cap base 98 disposed between the flanges 132, 134. The forward and aft flanges 132, 134 and the shroud cap base 98 have circular cross-section holes 145 therethrough.

Figure 10:
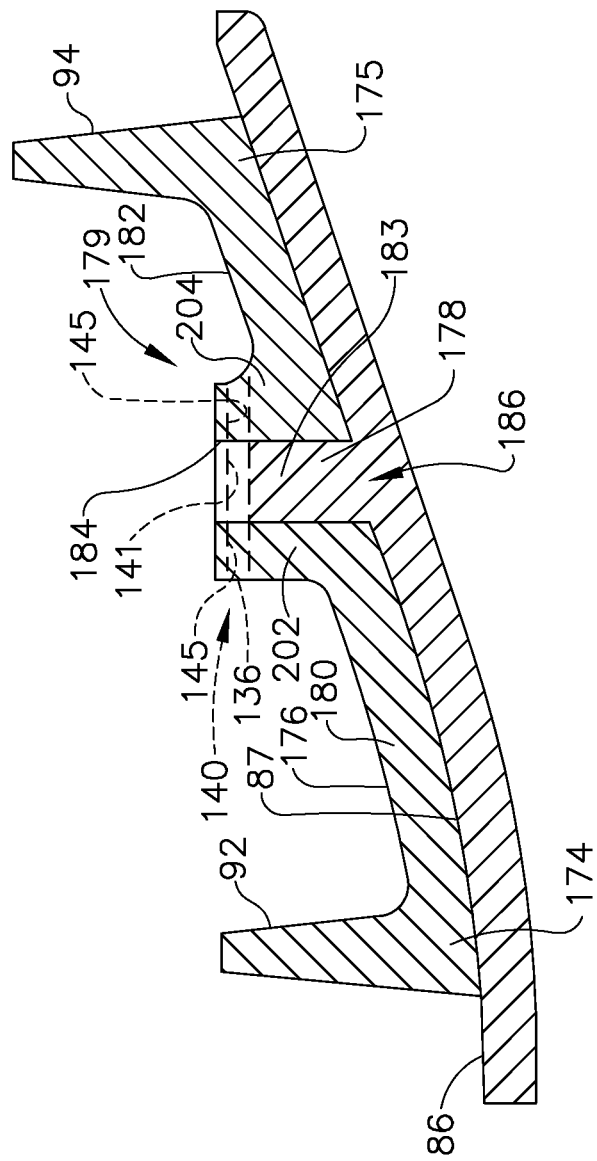
FIG. 10 is a sectional view illustration of an alternative low pressure turbine blade tip shroud metallic shroud cap supporting two seal teeth.
Figure 11:
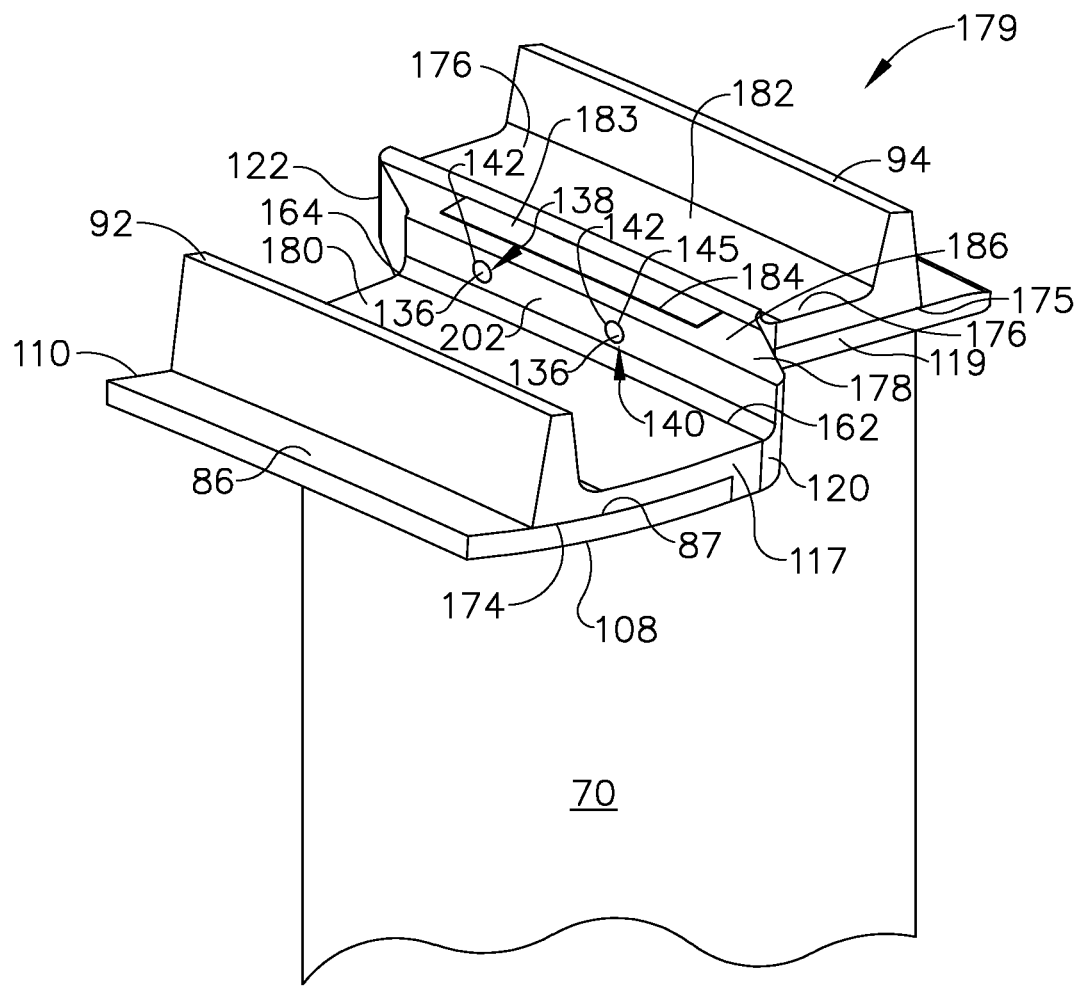
FIG. 11 is a perspective view illustration of the alternative metallic shroud cap illustrated in FIG. 9.

Illustrated in FIGS. 10 and 11 is a first alternative shroud assembly 179 that includes a dual tooth metallic shroud cap 176 supported on the outer platform 86. Axially spaced apart forward and aft seal teeth 92, 94 are supported by and extend radially outwardly from the dual tooth metallic shroud cap 176. The embodiment of the dual tooth metallic shroud cap 176 illustrated herein includes the forward and aft seal teeth 92, 94 being integral with or integrally formed with the dual tooth metallic shroud cap 176.

The dual tooth metallic shroud cap 176 includes a horizontally or circumferentially extending dual tooth shroud cap base 178 integral or integrally formed with the dual tooth metallic shroud cap 176. The dual tooth shroud cap base 178 rises up or extends radially outwardly from the dual tooth metallic shroud cap 176. Forward and aft shroud wings 180, 182 of the dual tooth metallic shroud cap 176 extend forwardly and aftwardly respectively away from the dual tooth shroud cap base 178. A horizontally or circumferentially extending elongated rectangular slot 184 is disposed in or near a middle 186 of the dual tooth shroud cap base 178 and between the forward and aft shroud wings 180, 182. The forward and aft seal teeth 92, 94 are located at forward and aft distal ends 174, 175 respectively of the dual tooth shroud cap base 178 and the forward and aft shroud wings 180, 182. The forward and aft shroud wings 180, 182 contact, are disposed upon, and conform to the outer shroud surface 87 of the outer platform 86. The forward and aft shroud wings 180, 182 conform to the shape and size of the portion of the outer shroud surface 87 of the outer platform 86 it contacts.

Integral with the CMC outer platform 86 is a center flange 183 extending radially outwardly from the outer shroud surface 87 of the outer platform 86 and through the rectangular slot 184 in the dual tooth shroud cap base 178. The center flange 183 is made of the same ceramic or ceramic matrix composite (CMC) material as is the rest of the turbine blade 70. Cylindrical pins 136 are disposed through horizontally or circumferentially spaced apart first and second sets 138, 140 of axially aligned holes 142 in the center flange 183 and axially spaced apart forward and aft walls 202, 204 of the shroud cap base 98 therebetween. The exemplary embodiment of the holes 142 of the second set 140 in the forward and aft walls 202, 204 of the shroud cap base 98 are circular cross-section holes 145. The exemplary embodiment of the holes 142 of the second set 140 in the center flange 183 are non-circular cross-section holes 141 illustrated herein as having a cross-sectional racetrack shape as described above with semi-circular horizontally or circumferentially spaced apart first and second ends and a rectangular middle section therebetween.

The dual tooth shroud cap base 178 further includes horizontally or circumferentially spaced apart clockwise and counter-clockwise side legs 120, 122 at opposite horizontally or circumferentially spaced apart clockwise and counter-clockwise distal ends 124, 126 respectively of the shroud cap base 98. The clockwise and counter-clockwise side legs 120, 122 extend radially inwardly or downwardly towards the airfoil base 78.

The clockwise and counter-clockwise side legs 120, 122 conform and complete the shape of the convex portions 117 and concave portions 119 of the clockwise and counter-clockwise facing shroud side edges 108, 110 of the shroud assembly 99 as illustrated in FIG. 5. Clockwise and counter-clockwise contact surfaces 152, 153 are disposed at opposite horizontally or circumferentially spaced apart clockwise and counter-clockwise distal ends 124, 126 respectively of the dual tooth shroud cap base 178. In the exemplary embodiment of the dual tooth shroud cap base 178 illustrated herein, the clockwise and counter-clockwise contact surfaces 152, 153 are disposed on the clockwise and counter-clockwise side legs 120, 122 respectively. The clockwise side legs 120 contact the counter-clockwise side legs 122 along the forward and aft contact surfaces 152, 153 described above. The clockwise and counter-clockwise side legs 120, 122 are received within clockwise and counter-clockwise facing notches 162, 164 in the tip shroud 88.

Figure 12:
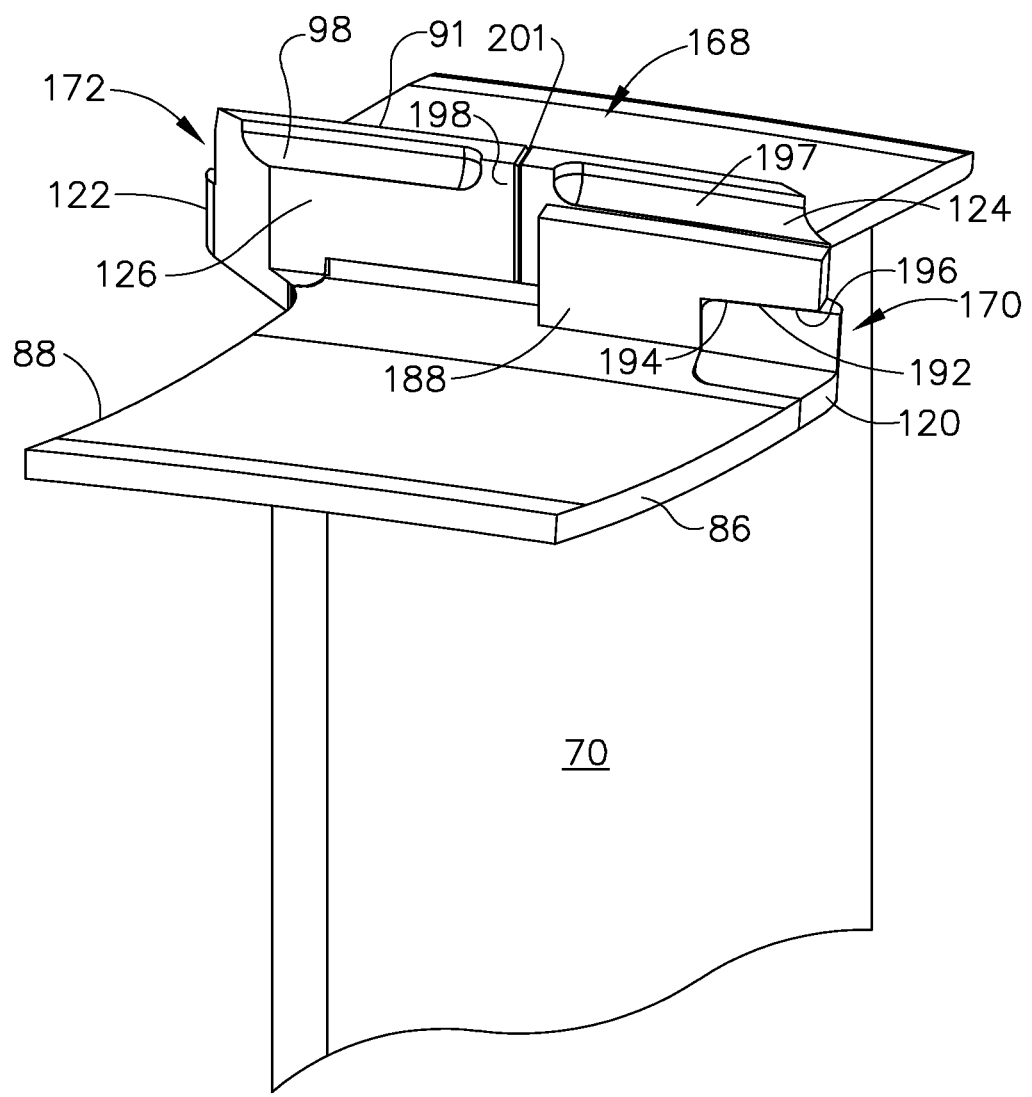
FIG. 12 is a perspective view illustration of the blade tip illustrated in FIG. 1 with alternative shroud and metallic shroud cap configurations using no pins to hold the seal tooth in the metallic shroud cap.
Figure 13:
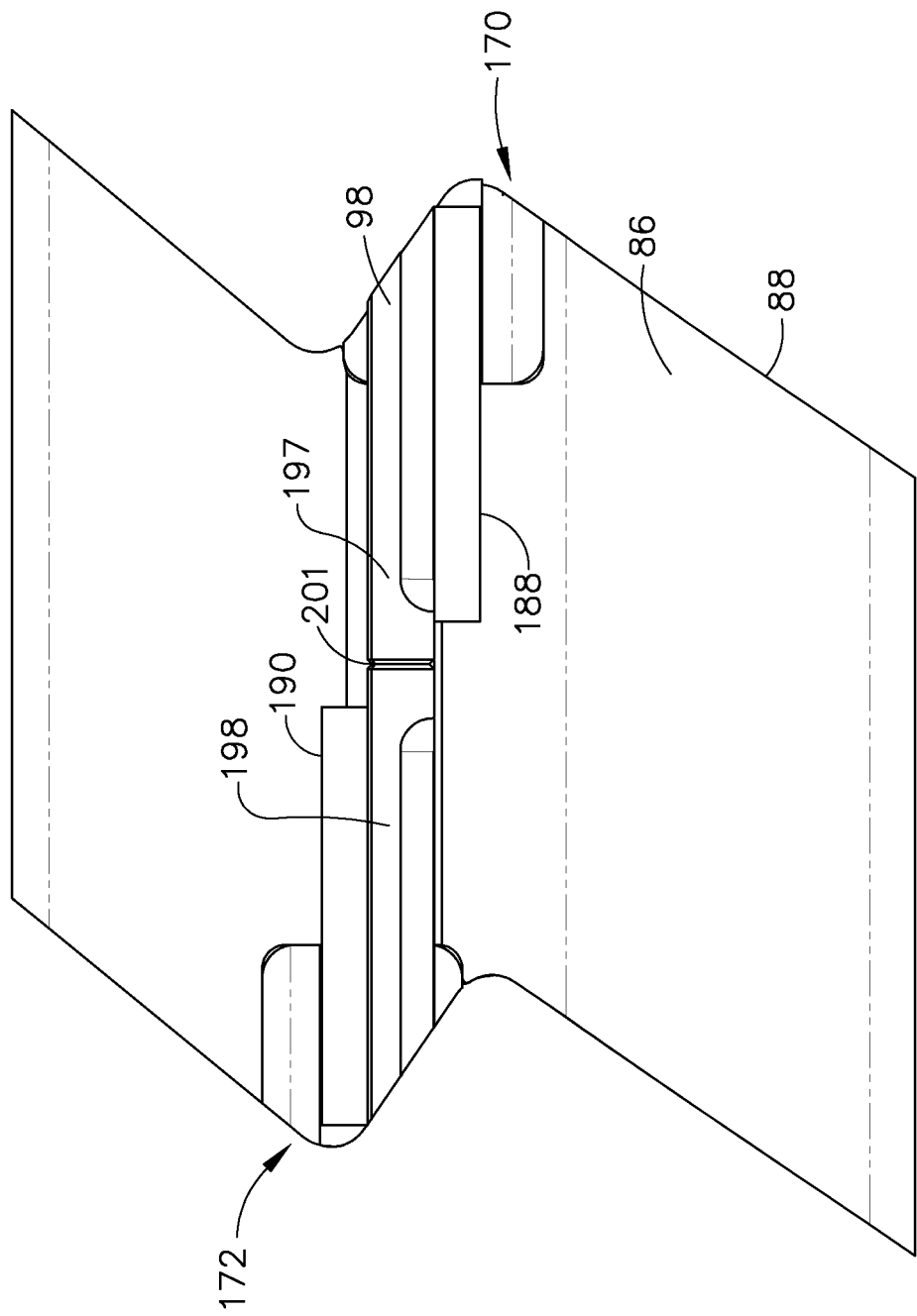
FIG. 13 is a top looking down view illustration of the alternative shroud and metallic shroud cap configurations illustrated in FIG. 12.

Illustrated in FIGS. 12 and 13 is a pinless mounting assembly 168 incorporating horizontally or circumferentially spaced apart clockwise and counter-clockwise bridle joints 170, 172. The shroud cap base 98 is disposed between forward and aft half flanges 188, 190 extending radially outwardly from the outer platform 86 of the tip shroud 88. The forward and aft half flanges 188, 190 are made from the same ceramic or ceramic matrix composite (CMC) material as is the rest of the turbine blade 70 and is integral with the tip shroud 88.

The shroud cap 96 further includes horizontally or circumferentially spaced apart clockwise and counter-clockwise side legs 120, 122 at opposite horizontally or circumferentially spaced apart clockwise and counter-clockwise distal ends 124, 126 respectively of the shroud cap base 98. The clockwise and counter-clockwise side legs 120, 122 extend radially inwardly or downwardly towards the airfoil base 78 illustrated in FIG. 1.

The forward and aft half flanges 188, 190 include joint slots 192 that function as mortises 194 of the clockwise and counter-clockwise bridle joints 170, 172. Generally, axially extending tenons 196 on the clockwise and counter-clockwise side legs 120, 122 are received within the mortises 194 of the clockwise and counter-clockwise bridle joints 170, 172 respectively thus forming the clockwise and counter-clockwise bridle joints 170, 172. The shroud cap 96 is installed in clockwise and counter-clockwise sections 197, 198 onto the tip shroud 88. During this assembly, the tenons 196 of the clockwise and counter-clockwise side legs 120, 122 are slid into the mortises 194 in the forward and aft half flanges 188, 190. Then the two clockwise and counter-clockwise sections 197, 198 are joined along a seam 201 by welding, brazing, or other suitable metallic joining method. The two clockwise and counter-clockwise sections 197, 198 are joined along a split in shroud cap base 98 between the two sections of the shroud cap 96.

Figure 14:
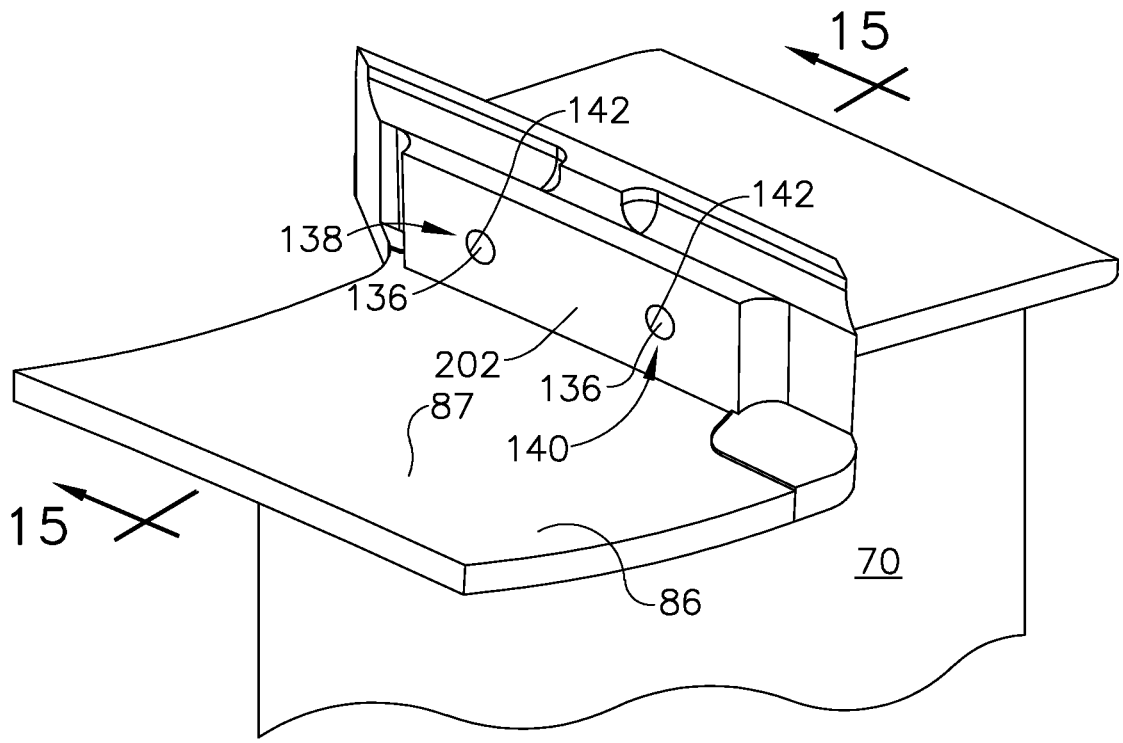
FIG. 14 is a perspective view illustration of an alternative shroud and an integral metallic shroud cap and seal tooth.
Figure 15:
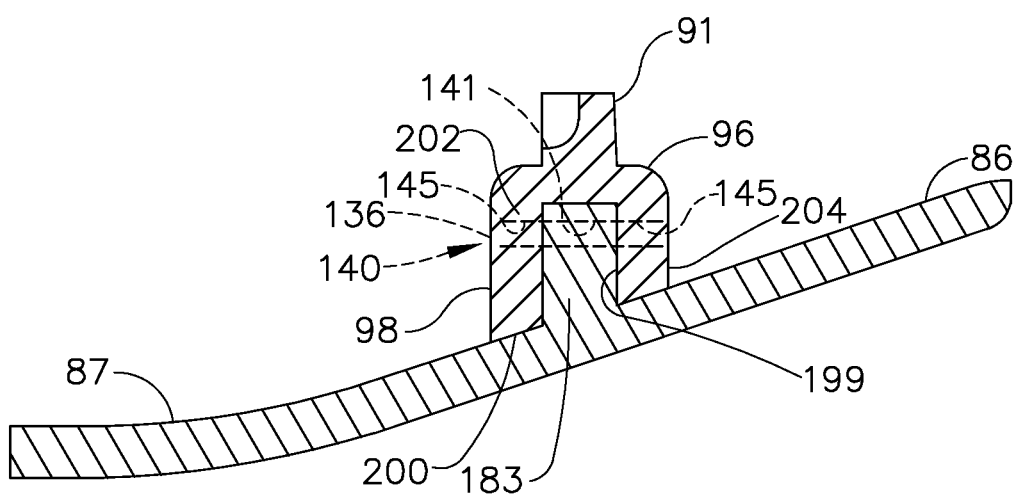
FIG. 15 is a sectional view illustration of the turbine blade tip shroud metallic shroud cap illustrated in FIG. 1.

Illustrated in FIGS. 14 and 15 is an integral shroud cap 96 and seal tooth 91. The seal tooth 91 extends radially outwardly from the shroud cap base 98. A horizontally or circumferentially extending elongated rectangular cavity 199 extends radially outwardly from an underside 200 of and partially through the shroud cap base 98. Integral with the CMC outer platform 86 is a center flange 183 extending radially outwardly from the outer shroud surface 87 of the outer platform 86 and received within the cavity 199. The center flange 183 is made of the same ceramic or ceramic matrix composite (CMC) material as is the rest of the turbine blade 70.

Cylindrical pins 136 are disposed through horizontally or circumferentially spaced apart first and second sets 138, 140 of axially aligned holes 142 in the center flange 183 and axially spaced apart forward and aft walls 202, 204 of the shroud cap base 98 that bound the cavity 199. The exemplary embodiment of the holes 142 of the second set 140 in the forward and aft walls 202, 204 of the shroud cap base 98 are circular cross-section holes 145. The exemplary embodiment of the holes 142 of the second set 140 in the center flange 183 are non-circular cross-section holes 141 illustrated herein as having a cross-sectional racetrack shape as described above with semi-circular horizontally or circumferentially spaced apart first and second ends and a rectangular middle section therebetween.

Figure 16:
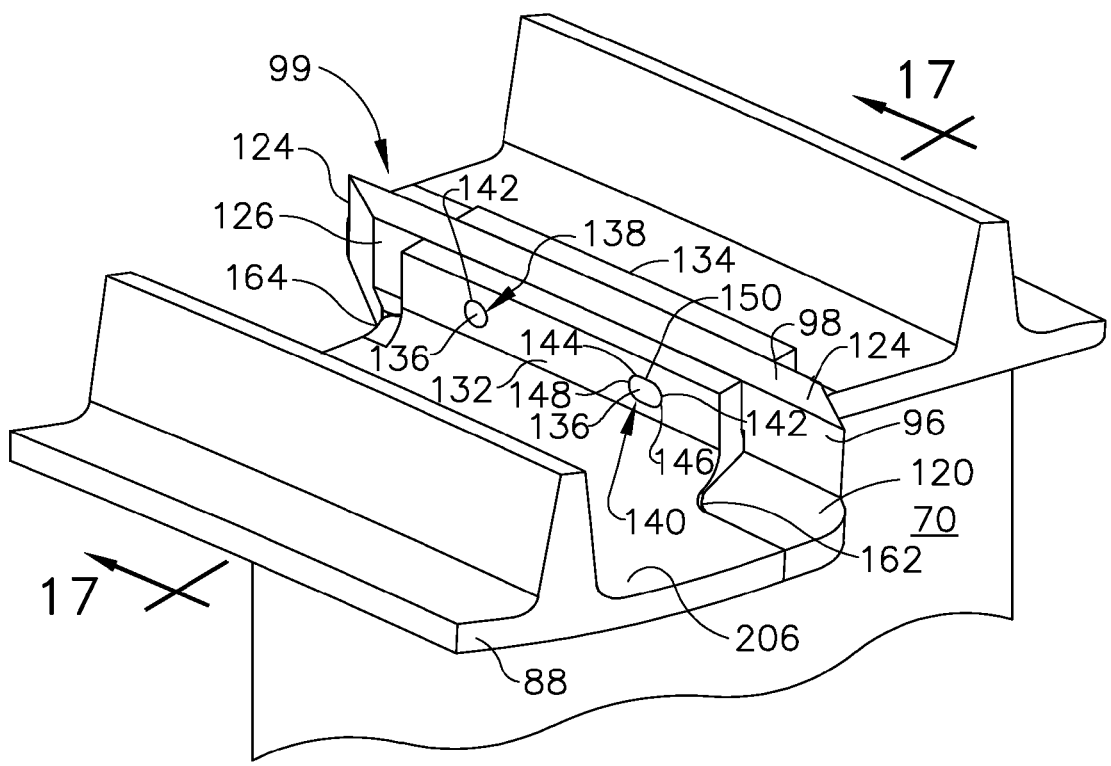
FIG. 16 is a perspective view illustration of an alternative shroud CMC turbine blade tip shroud supporting two CMC teeth and a metallic shroud cap disposed therebetween.
Figure 17:
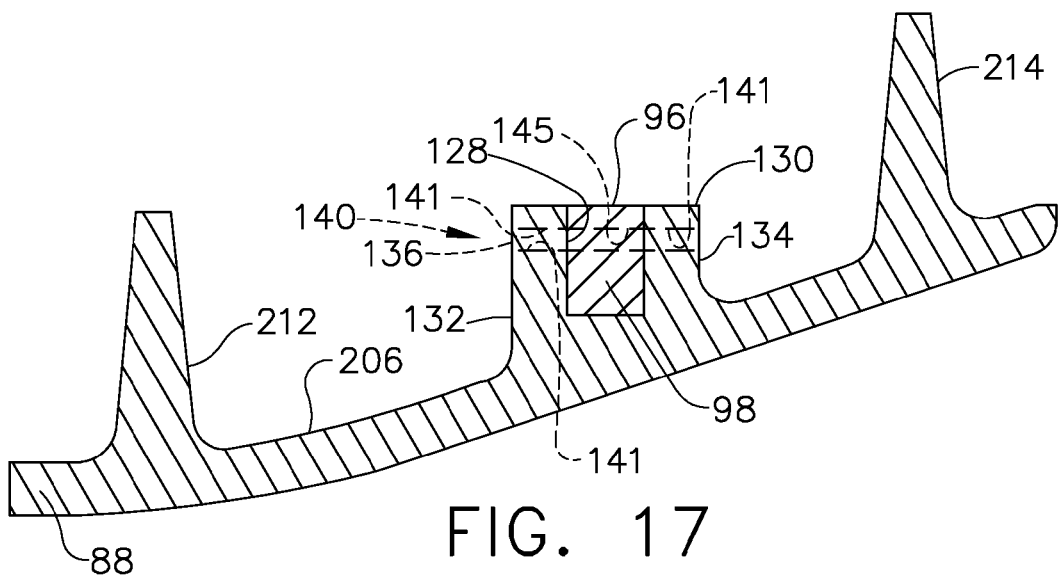
FIG. 17 is a sectional view illustration of the CMC turbine blade tip shroud and metallic shroud cap illustrated in FIG. 16.

Illustrated in FIGS. 16 and 17 is a CMC dual tooth outer platform 206 including axially spaced apart CMC forward and aft seal teeth 212, 214 supported by and extend radially outwardly from the dual tooth outer platform 206. A metallic shroud cap 96 includes a shroud cap base 98 disposed in a slot 128 of a bracket 130. The bracket 130 is integral with and extends radially outwardly from the dual tooth outer platform 206 of the tip shroud 88. The shroud cap base 98 is disposed between radially outwardly extending forward and aft flanges 132, 134 of the bracket 130. The bracket 130 and the forward and aft flanges 132, 134 are made of the same ceramic or ceramic matrix composite (CMC) material as is the rest of the turbine blade 70.

The shroud cap 96 further includes horizontally or circumferentially spaced apart clockwise and counter-clockwise side legs 120, 122 at opposite horizontally or circumferentially spaced apart clockwise and counter-clockwise distal ends 124, 126 respectively of the shroud cap base 98. The clockwise and counter-clockwise side legs 120, 122 extend radially inwardly or downwardly towards the airfoil base 78.

The clockwise and counter-clockwise side legs 120, 122 conform and complete the shape of the convex portions 117 and concave portions 119 of the clockwise and counter-clockwise facing shroud side edges 108, 110 of the shroud assembly 99. The clockwise side legs 120 contact the counter-clockwise side legs 122 along the forward and aft contact surfaces 152, 153 described above. The clockwise and counter-clockwise side legs 120, 122 are received within clockwise and counter-clockwise facing notches 162, 164 in the tip shroud 88.

Cylindrical pins 136 are disposed through horizontally or circumferentially spaced apart first and second sets 138, 140 of axially aligned holes 142 in the forward and aft flanges 132, 134 and the shroud cap base 98 therebetween similar to the embodiment of the forward and aft flanges 132, 134 and the shroud cap base 98 illustrated in FIGS. 4, 6, and 7 and as described above. The metallic shroud cap 96 should be mounted to the CMC tip shroud 88 in such a fashion to be firmly located, but configured so as to not cause excessive stresses due to differential thermal expansion between the CMC tip shroud 88 and the metallic shroud cap 96. The exemplary embodiment of the holes 142 in the first set 138 of holes 142 are all cylindrical with circular cross-sections. The exemplary embodiment of the holes 142 in the second set 140 includes non-circular cross-section holes 141 through the forward and aft flanges 132, 134 and circular cross-section holes 145 through the shroud cap base 98. The exemplary embodiment of the non-circular cross-section holes 141 have a cross-sectional racetrack shape 144 with semi-circular horizontally or circumferentially spaced apart first and second ends 146, 148 and a rectangular middle section 150 therebetween.

Figure 18:
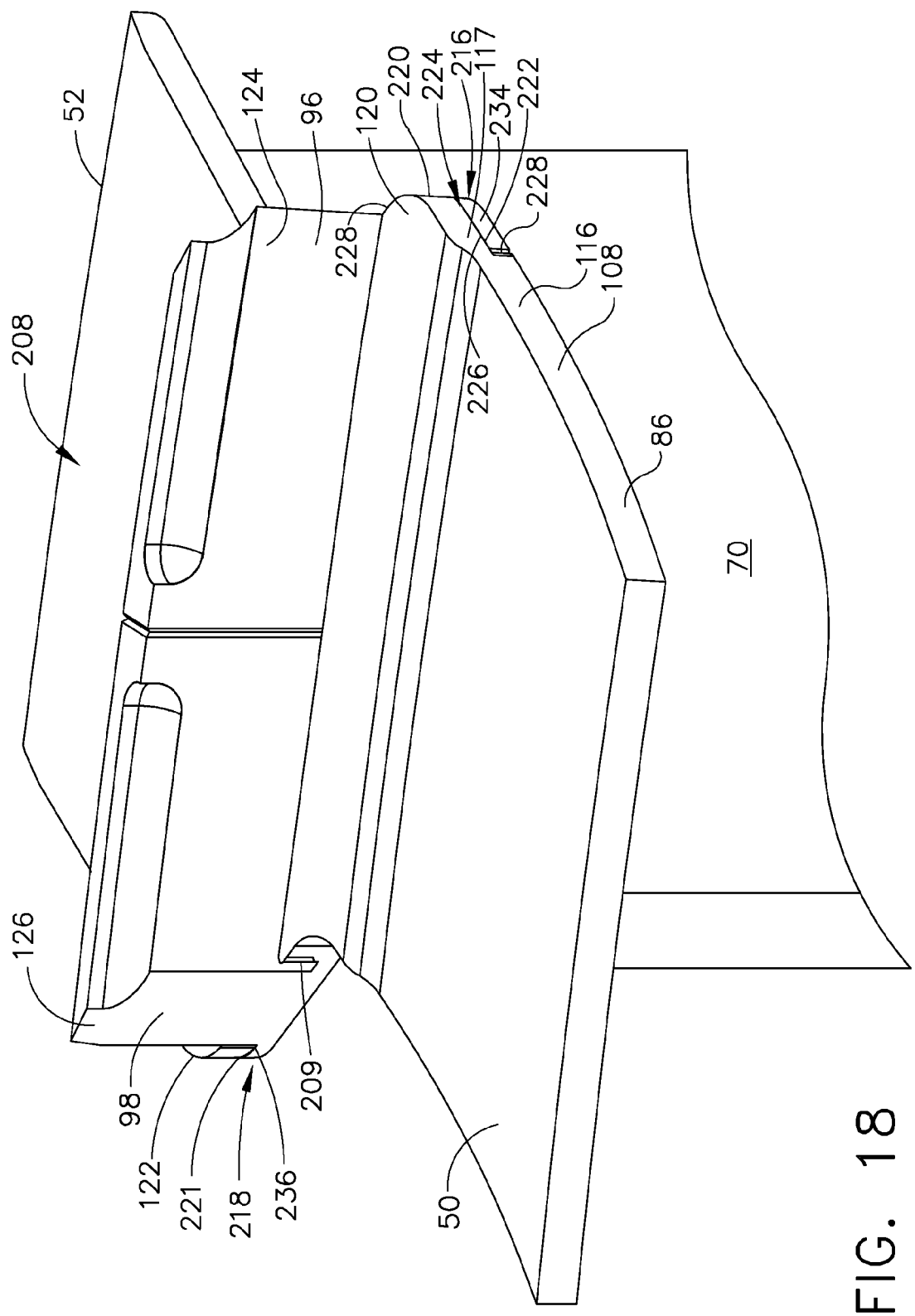
FIG. 18 is a perspective view illustration of an alternative metallic shroud cap partially wrapped around a CMC turbine blade tip shroud.

Illustrated in FIG. 18 is another pinless mounting shroud assembly 208 incorporating horizontally or circumferentially spaced apart clockwise and counter-clockwise end lap joints 216, 218 also referred to as a pull lap joints. The outer platform 86 is divide into forward and aft sections 50, 52 with a slot 209 therebetween. The shroud cap base 98 of the shroud cap 96 is at least partially disposed in the slot 209.

The shroud cap 96 further includes horizontally or circumferentially spaced apart clockwise and counter-clockwise side legs 120, 122 at opposite horizontally or circumferentially spaced apart clockwise and counter-clockwise distal ends 124, 126 respectively of the shroud cap base 98. The clockwise and counter-clockwise side legs 120, 122 extend radially inwardly or downwardly towards the airfoil base 78.

The convex portions 117 on the clockwise facing shroud side edge 108 of each of the outer platforms 86 of tip shrouds 88 include forward and aft corners 220, 221 located on the aft and forward sections 52, 50 respectively of the outer platform 86 and bordering the slot 209 therebetween. Each of the forward and aft corners 220, 221 include a platform cheek 222 and a platform shoulder 224 (cut or formed therein) of the clockwise and counter-clockwise end lap joints 216, 218.

The clockwise and counter-clockwise side legs 120, 122 include axially extending clockwise and counter-clockwise flanges 234, 236 respectively. Each of the clockwise and counter-clockwise flanges 234, 236 include a shroud cap cheek 226 and a shroud cap shoulder 228 of the clockwise and counter-clockwise end lap joints 216, 218 respectively. The platform cheeks 222 are in direct contact with and pressed against the shroud cap cheeks 226 of the respective clockwise and counter-clockwise end lap joints 216, 218. The platform cheeks 222 are butted up against the shroud cap shoulders 228 of the respective clockwise and counter-clockwise end lap joints 216, 218. The shroud cap cheeks 226 are butted up against the platform shoulders 224 of the respective clockwise and counter-clockwise end lap joints 216, 218.

The shroud cap 96 is installed in two sections onto the tip shroud 88. During this assembly, the platform cheeks 222 are slid up against and in direct contact the shroud cap cheeks 226 until the shroud cap cheeks 226 are butted up against the platform shoulders 224 of the respective clockwise and counter-clockwise end lap joints 216, 218. Then the two sections are joined by welding, brazing, or other suitable metallic joining method. The two sections are joined along a split in shroud cap base 98 between the two sections of the shroud cap 96.

Figure 19:
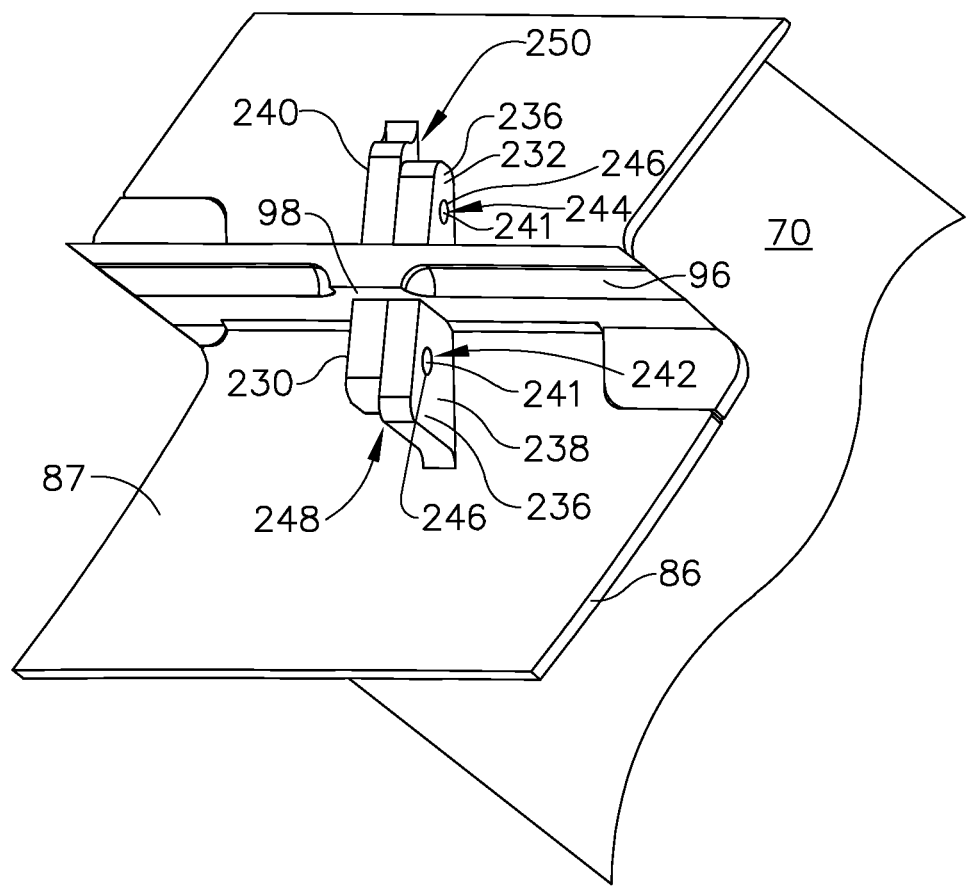
FIG. 19 is a perspective view illustration of an alternative CMC turbine blade tip shroud and metallic shroud cap having corresponding mounting lugs extending in an axial direction.

Illustrated in FIG. 19 is an alternative shroud assembly that is similar to the shroud assembly illustrated in FIGS. 4 and 5 and includes a metallic shroud cap 96 supported on the outer platform 86. The shroud cap 96 includes forward and aft cap flanges 230, 232 extending axially forwardly and aftwardly respectively from and oriented perpendicular to the shroud cap base 98. Forward and aft ceramic flanges 238, 240 extend radially outwardly from and are integral with the outer platform 86 of the tip shroud 88. The forward and aft ceramic flanges 238, 240 are oriented perpendicular to the shroud cap base 98. The forward and aft ceramic flanges 238, 240 are flush against and parallel to the forward and aft cap flanges 230, 232. The forward and aft ceramic flanges 238, 240 are made of the same ceramic, or ceramic matrix composite (CMC) material as is the rest of the turbine blade 70.

Cylindrical pins 241 are disposed through axially spaced apart forward and aft sets 242, 244 of axially aligned holes 246 in axially spaced apart forward and aft sets of flanges 248, 250. The forward set of flanges 248 includes the forward ceramic flange 238 and the forward cap flange 230. The aft set of flanges 250 includes the aft ceramic flange 240 and the aft cap flange 232.

In order to not cause excessive stresses due to differential thermal expansion between the CMC tip shroud 88 and the metallic shroud cap 96, one of forward and aft sets 242, 244 of axially aligned holes 246 in the forward and aft ceramic flanges 238, 240 respectively has a cross-sectional racetrack shape 144 with semi-circular horizontally or circumferentially spaced apart first and second ends 146, 148 and a rectangular middle section 150 therebetween. The forward and aft cap flanges 230, 232 have holes that are circular in cross-section.

By making the shroud cap 96 less brittle than the ceramic or ceramic matrix composite (CMC) material of the low pressure turbine blades 70 the interlock faces provided by the clockwise and counter-clockwise contact surfaces disposed at opposite horizontally or circumferentially spaced apart clockwise and counter-clockwise distal ends respectively of the shroud cap base have improved durability of the turbine tip shroud and blade. The interlock faces of the turbine blades impact and move relative to each other causing chipping, cracking, fretting wear, and overall material loss. CMC and ceramic materials have the material strength capability to handle loads a typical low pressure turbine blade shroud might experience during engine operation. On the other hand, CMC and ceramic materials are challenged by the durability requirement at the interlock faces which involve the material withstanding impact contact and relative motion. This type of operation is concerning for a material that is sensitive to flaws, has undesirable wear characteristics, and is overall brittle in nature. Brittle materials, such as ceramic or ceramic matrix composite, generally fail with little to no evidence of plastic deformation.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. A gas turbine engine blade shroud assembly comprising:
   a ceramic airfoil tip shroud including a circumferentially extending outer platform,
   at least one seal tooth supported by and extending radially outwardly away from and circumferentially parallel to the outer platform,
   a shroud cap supported on the outer platform,
   the shroud cap being less brittle than the outer platform,
   the shroud cap including a horizontally or circumferentially extending shroud cap base having horizontally or circumferentially spaced apart clockwise and counter-clockwise distal ends,
   the at least one seal tooth mounted on and extending radially outwardly away from the shroud cap base,
   clockwise and counter-clockwise facing clockwise and counter-clockwise contact surfaces located at the clockwise and counter-clockwise distal ends respectively,
   the clockwise contact surface being aft facing and the counter-clockwise contact surface being forward facing or the clockwise contact surface being forward facing, and the counter-clockwise contact surface being aft facing, and
   the clockwise and counter-clockwise facing clockwise and counter-clockwise contact surfaces located on horizontally or circumferentially spaced apart clockwise and counter-clockwise side legs at the clockwise and counter-clockwise distal ends respectively of the shroud cap base.

2. The shroud assembly as claimed in claim 1, further comprising the clockwise and counter-clockwise contact surfaces being flat and angled at clockwise and counter-clockwise angles respectively with respect to a circumferentially extending base centerline of the shroud cap base.

3. The shroud assembly as claimed in claim 1, further comprising the at least one seal tooth being integral with or integrally formed with the shroud cap base.

4. The shroud assembly as claimed in claim 1, further comprising:
   the shroud cap base disposed in a slot of a bracket extending radially outwardly from the outer platform of the tip shroud,
   the shroud cap base disposed between radially outwardly extending forward and aft flanges of the bracket, and
   the bracket and the tip shroud made of the same material.

5. The shroud assembly as claimed in claim 4, further comprising pins disposed through horizontally or circumferentially spaced apart first and second sets of axially aligned holes in the forward and aft flanges and the shroud cap base therebetween.

6. The shroud assembly as claimed in claim 5, further comprising:
   the pins being cylindrical,
   the first set of the holes having a circular cross-section,
   circular cross-section holes of the second set of the holes disposed through the shroud cap base, and
   non-circular cross-section holes of the second set of the holes disposed through the forward and aft flanges.

7. The shroud assembly as claimed in claim 6, further comprising each of the non-circular cross-section holes having a cross-sectional racetrack shape with semi-circular horizontally or circumferentially spaced apart first and second ends and a rectangular middle section therebetween.

8. The shroud assembly as claimed in claim 1, further comprising the ceramic airfoil tip shroud and the outer platform being made of a ceramic or a ceramic matrix composite material and the shroud cap being made of a metallic material.

9. The shroud assembly as claimed in claim 1, further comprising:
   the shroud cap being a dual tooth shroud cap and the shroud cap base being a dual tooth shroud cap base integral or integrally formed with the dual tooth shroud cap,
   wherein the at least one seal tooth comprises axially spaced apart forward and aft seal teeth that are supported by and extend radially outwardly away from the dual tooth shroud cap, and
   the axially spaced apart forward and aft seal teeth extending circumferentially parallel to a radially outwardly facing outer shroud surface of the outer platform.

10. The shroud assembly as claimed in claim 9, further comprising:
    the axially spaced apart forward and aft seal teeth being integral with or integrally formed with the dual tooth shroud cap,
    the dual tooth shroud cap base rising up or extending radially outwardly from the dual tooth shroud cap,
    a horizontally or circumferentially extending elongated rectangular slot located between forward and aft shroud wings of the dual tooth shroud cap extending forwardly and aftwardly respectively away from the dual tooth shroud cap base,
    a center flange integral with the outer platform and extending radially outwardly from the outer shroud surface of the outer platform, and
    the center flange extending through the rectangular slot in the dual tooth shroud cap base.

11. The shroud assembly as claimed in claim 10, further comprising the ceramic airfoil tip shroud and the outer platform being made of a ceramic or a ceramic matrix composite material and the shroud cap being made of a metallic material.

12. The shroud assembly as claimed in claim 11, further comprising:
    cylindrical pins disposed through horizontally or circumferentially spaced apart first and second sets of axially aligned holes in the center flange and forward and aft walls of the shroud cap base, the first set of the holes having a circular cross section, circular cross-section holes of the second set of the holes disposed through the forward and aft walls of the shroud cap base, non-circular cross-section holes of the second set of the holes disposed through the center flange, and
    each of the non-circular cross-section holes having a cross-sectional racetrack shape with semi-circular horizontally or circumferentially spaced apart first and second ends and a rectangular middle section therebetween.

13. The shroud assembly as claimed in claim 1, further comprising:
    the shroud cap base disposed between forward and aft half flanges extending radially outwardly from the outer platform of the tip shroud,
    clockwise and counter-clockwise bridle joints near circumferentially spaced apart clockwise and counter-clockwise facing shroud side edges of the shroud assembly respectively, the forward and aft half flanges include mortises of the clockwise and counter-clockwise bridle joints, and tenons of the clockwise and counter-clockwise bridle joints axially extending from the clockwise and counter-clockwise distal ends, of the shroud cap base being received within the mortises.

14. The shroud assembly as claimed in claim 13, further comprising the shroud cap including clockwise and counter-clockwise sections joined along a seam therebetween.

15. The shroud assembly as claimed in claim 1, further comprising:

the seal tooth extending radially outwardly from the shroud cap base, a horizontally or circumferentially extending elongated rectangular cavity extending radially outwardly from an underside of and partially through the shroud cap base, a center flange extending radially outwardly from the outer shroud surface of the outer platform and received within the cavity, and the center flange integral with the outer platform.

16. The shroud assembly as claimed in claim 15, further comprising:

cylindrical pins disposed through horizontally or circumferentially spaced apart first and second sets of axially aligned holes in axially spaced apart forward and aft walls of the shroud cap base that bound the cavity and through the center flange therebetween, the first set of the holes having a circular cross-section, circular cross-section holes of the second set of the holes disposed through the forward and aft walls, non-circular cross-section holes of the second set of the holes disposed through the center flange, and each of the non-circular cross-section holes having a cross-sectional racetrack shape with semi-circular horizontally or circumferentially spaced apart first and second ends and a rectangular middle section therebetween.

17. The shroud assembly as claimed in claim 16, further comprising the ceramic airfoil tip shroud and the outer platform being made of a ceramic or a ceramic matrix composite material and the shroud cap being made of a metallic material.

18. The shroud assembly as claimed in claim 1, further comprising the outer platform being a dual tooth outer platform including the at least one seal tooth, wherein the at least one seal tooth comprises axially spaced apart forward and aft seal teeth being integral with and extending radially outwardly from the dual tooth outer platform.

19. The shroud assembly as claimed in claim 18, further comprising:

the shroud cap base disposed in a slot of a bracket extending radially outwardly from the outer platform of the tip shroud, the shroud cap base disposed between radially outwardly extending forward and aft flanges, of the bracket, and the bracket and the tip shroud made of the same material.

20. The shroud assembly as claimed in claim 17, further comprising:

cylindrical pins disposed through horizontally or circumferentially spaced apart first and second sets of axially aligned holes in the forward and aft flanges and the shroud cap base therebetween, the first set of the holes having a circular cross-section, circular cross-section holes of the second set of the holes disposed through the shroud cap base, non-circular cross-section holes of the second set of the holes disposed through the forward and aft flanges, and each of the non-circular cross-section holes having a cross-sectional racetrack shape with semi-circular horizontally or circumferentially spaced apart first and second ends and a rectangular middle section therebetween.

21. The shroud assembly as claimed in claim 20, further comprising the ceramic airfoil tip shroud and the outer platform being made of a ceramic or a ceramic matrix composite material and the shroud cap being made of a metallic material.

22. The shroud assembly as claimed in claim 1, further comprising:

the outer platform including forward and aft sections with a slot therebetween, the shroud cap base at least partially disposed in the slot and extending radially outwardly from the outer platform of the tip shroud, forward and aft corners on the aft and forward sections respectively and bordering the slot therebetween, clockwise and counter-clockwise end lap joints near circumferentially spaced apart clockwise and counter-clockwise facing shroud side edges of the shroud assembly respectively, one of the forward corners and one of the aft corners each including a platform cheek and a platform shoulder of the clockwise and counter-clockwise end lap joints, the clockwise and counter-clockwise side legs including axially extending clockwise and counter-clockwise flanges respectively, each of the clockwise and counter-clockwise flanges including a shroud cap cheek and a shroud cap shoulder of the clockwise and counter-clockwise end lap joints respectively, the platform cheeks directly contacting and pressed against the shroud cap cheeks of the respective clockwise and counter-clockwise end lap joints, the platform cheeks butting up against the shroud cap shoulders of the respective clockwise and counter-clockwise end lap joints, the shroud cap cheeks butting up against the platform shoulders of the respective clockwise and counter-clockwise end lap joints, and the shroud cap including clockwise and counter-clockwise sections joined along a seam therebetween.

23. The shroud assembly as claimed in claim 1, further comprising:

forward and aft cap flanges extending axially forwardly and aftwardly respectively from and oriented perpendicular to the shroud cap base, forward and aft ceramic flanges extending radially outwardly from and being integral with the outer platform of the tip shroud, the forward and aft cap flanges oriented perpendicular to the shroud cap base, and the forward and aft ceramic flanges flush against and parallel to the forward and aft cap flanges respectively.

24. The shroud assembly as claimed in claim 23, further comprising:

pins disposed through axially spaced apart forward and aft sets of axially aligned holes in axially spaced apart forward and aft sets of flanges, the forward set of flanges including the forward ceramic flange and the forward cap flange, and the aft set of flanges including the aft ceramic flange and the aft cap flange.

25. The shroud assembly as claimed in claim 24, further comprising the ceramic airfoil tip shroud and the outer platform being made of a ceramic or a ceramic matrix composite material and the shroud cap being made of a metallic material.

26. A gas turbine engine turbine blade assembly comprising:

a ceramic turbine blade,
the turbine blade including an airfoil having pressure and suction sides extending radially outwardly from an inner platform to a blade tip,
a ceramic airfoil tip shroud at the blade tip,
the tip shroud including a circumferentially extending outer platform,
at least one seal tooth supported by and extending radially outwardly away from and circumferentially parallel to the outer platform,
a shroud cap supported on the outer platform,
the shroud cap being less brittle than the outer platform,
the shroud cap including a horizontally or circumferentially extending shroud cap base having horizontally or circumferentially spaced apart clockwise and counter-clockwise distal ends,
the at least one seal tooth mounted on and extending radially outwardly away from the shroud cap base,
clockwise and counter-clockwise facing clockwise and counter-clockwise contact surfaces located at the clockwise and counter-clockwise distal ends respectively,
the clockwise contact surface being aft facing and the counter-clockwise contact surface being forward facing or the clockwise contact surface being forward facing and the counter-clockwise contact surface being aft facing, and
the clockwise and counter-clockwise facing clockwise and counter-clockwise contact surfaces located on horizontally or circumferentially spaced apart clockwise and counter-clockwise side legs at the clockwise and counter-clockwise distal ends respectively of the shroud cap base.

27. The turbine blade assembly as claimed in claim 26, further comprising the clockwise and counter-clockwise contact surfaces being flat and angled at clockwise and counter-clockwise angles with respect to a circumferentially extending base centerline of the shroud cap base.

28. The turbine blade assembly as claimed in claim 27, further comprising:
the shroud cap base disposed in a slot of a bracket extending radially outwardly from the outer platform of the tip shroud,
the shroud cap base disposed between radially outwardly extending forward and aft flanges of the bracket, and
the bracket and the tip shroud made of the same ceramic material.

29. The turbine blade assembly as claimed in claim 28, further comprising:
cylindrical pins disposed through horizontally or circumferentially spaced apart first and second sets of axially aligned holes in the forward and aft flanges and the shroud cap base therebetween,
the first set of the holes having a circular cross-section,
circular cross-section holes of the second set of the holes disposed through the forward and aft flanges,
a non-circular cross-section hole of the second set of the holes disposed through the forward and aft flanges, and
the non-circular cross-section hole having a cross-sectional racetrack shape with semi-circular horizontally or circumferentially spaced apart first and second ends and a rectangular middle section therebetween.

30. The turbine blade assembly as claimed in claim 29, further comprising the ceramic material being a ceramic matrix composite.

31. The turbine blade assembly as claimed in claim 26, further comprising:
the shroud cap being a dual tooth shroud cap and the shroud cap base being a dual tooth shroud cap base integral with or integrally formed with the dual tooth shroud cap,
wherein the at least one seal tooth comprises axially spaced apart forward and aft seal teeth being integral with and extending radially outwardly away from the dual tooth shroud cap, and
the axially spaced apart forward and aft seal teeth extending circumferentially parallel to a radially outwardly facing outer shroud surface of the outer platform.

32. The turbine blade assembly as claimed in claim 31, further comprising:
the dual tooth shroud cap base rising up or extending radially outwardly from the dual tooth shroud cap,
a horizontally or circumferentially extending elongated rectangular slot located between forward and aft shroud wings of the dual tooth shroud cap extending forwardly and aftwardly respectively away from the dual tooth shroud cap base,
a center flange integral with the outer platform and extending radially outwardly from the outer shroud surface of the outer platform, and
the center flange extending through the rectangular slot in the dual tooth shroud cap base.

33. The turbine blade assembly as claimed in claim 26, further comprising:
the shroud cap base disposed between forward and aft half flanges extending radially outwardly from the outer platform of the tip shroud,
a shroud assembly including the outer platform and the shroud cap,
clockwise and counter-clockwise bridle joints near circumferentially spaced apart clockwise and counter-clockwise facing shroud side edges respectively of the shroud assembly,
the forward and aft half flanges include mortises of the clockwise and counter-clockwise bridle joints,
tenons of the clockwise and counter-clockwise bridle joints axially extending from the clockwise and counter-clockwise distal ends of the shroud cap base being received within the mortises, and
the shroud cap including clockwise and counter-clockwise sections joined along a seam therebetween.

34. The turbine blade assembly as claimed in claim 26, further comprising:
the at least one seal tooth extending radially outwardly from the shroud cap base,
a horizontally or circumferentially extending elongated rectangular cavity extending radially outwardly from an underside of and partially through the shroud cap base,
a center flange extending radially outwardly from the outer shroud surface of the outer platform and received within the cavity, and
the center flange integral with the outer platform.

35. The turbine blade assembly as claimed in claim 34, further comprising:
cylindrical pins disposed through horizontally or circumferentially spaced apart first and second sets of axially aligned holes in axially spaced apart forward and aft walls of the shroud cap base that bound the cavity and through the center flange therebetween,
the first set of the holes having a circular cross-section,
circular cross-section holes of the second set of the holes disposed through the forward and aft walls,
non-circular cross-section holes of the second set of the holes disposed through the center flange, and each of the non-circular cross-section holes having a cross-sectional racetrack shape with semi-circular horizontally or circumferentially spaced apart first and second ends and a rectangular middle section therebetween.

36. The turbine blade assembly as claimed in claim 26, further comprising:

the outer platform being a dual tooth outer platform including axially spaced apart forward and aft seal teeth integral with and extending radially outwardly from the dual tooth outer platform, the shroud cap base disposed in a slot of a bracket extending radially outwardly from the outer platform of the tip shroud, the shroud cap base disposed between forward and aft flanges of the bracket, and the bracket and the tip shroud made of the same ceramic material.

37. The turbine blade assembly as claimed in claim 36, further comprising:

cylindrical pins disposed through horizontally or circumferentially spaced apart first and second sets of axially aligned holes in the forward and aft flanges and the shroud cap base therebetween, the first set of the holes having a circular cross-section, circular cross-section holes of the second set of the holes disposed through the shroud cap base, non-circular cross-section holes of the second set of the holes disposed through the forward and aft flanges, and each of the non-circular cross-section holes having a cross-sectional racetrack shape with semi-circular horizontally or circumferentially spaced apart first and second ends and a rectangular middle section therebetween.

38. The turbine blade as claimed in claim 26, further comprising:

the outer platform including forward and aft sections with a slot therebetween, the shroud cap base at least partially disposed in the slot and extending radially outwardly from the outer platform of the tip shroud, forward and aft corners on the aft and forward sections respectively and bordering the slot therebetween, a shroud assembly including the outer platform and the shroud cap, clockwise and counter-clockwise end lap joints near circumferentially spaced apart clockwise and counter-clockwise facing shroud side edges of the shroud assembly respectively, one of the forward corners and one of the aft corners each including a platform cheek and a platform shoulder of the clockwise and counter-clockwise end lap joints, the clockwise and counter-clockwise facing clockwise and counter-clockwise contact surfaces located on horizontally or circumferentially spaced apart clockwise and counter-clockwise side legs at the clockwise and counter-clockwise distal ends respectively of the shroud cap base, the clockwise and counter-clockwise side legs including axially extending clockwise and counter-clockwise flanges respectively, each of the clockwise and counter-clockwise flanges including a shroud cap cheek and a shroud cap shoulder of the clockwise and counter-clockwise end lap joints respectively, the platform cheeks directly contacting and pressed against the shroud cap cheeks of the respective clockwise and counter-clockwise end lap joints, the platform cheeks butting up against the shroud cap shoulders of the respective clockwise and counter-clockwise end lap joints, the shroud cap cheeks butting up against the platform shoulders of the respective clockwise and counter-clockwise end lap joints, and clockwise and counter-clockwise sections joined along a seam therebetween.

39. The turbine blade assembly as claimed in claim 26, further comprising:

forward and aft cap flanges extending axially forwardly and aftwardly respectively from and oriented perpendicular to the shroud cap base, forward and aft ceramic flanges extending radially outwardly from and being integral with the outer platform of the tip shroud, the forward and aft cap flanges oriented perpendicular to the shroud cap base, and the forward and aft ceramic flanges flush against and parallel to the forward and aft cap flanges respectively.

40. The turbine blade assembly as claimed in claim 39, further comprising:

pins disposed through axially spaced apart forward and aft sets of axially aligned holes in axially spaced apart forward and aft sets of flanges, the forward set of flanges including the forward ceramic flange and the forward cap flange, and the aft set of flanges including the aft ceramic flange and the aft cap flange.

41. A gas turbine engine turbine rotor assembly comprising:

a circumferential row of turbine blades extending radially outwardly from a disk of a turbine rotor, the turbine blades made of a ceramic material, the turbine blades including airfoils having pressure and suction sides extending radially outwardly from inner platforms to blade tips, the turbine blades including airfoil tip shrouds at the blade tips, the tip shrouds including circumferentially extending outer platforms, at least one seal tooth supported by and extending radially outwardly away from and circumferentially parallel to each of the outer platforms, shroud caps supported on the outer platforms, the shroud caps being less brittle than the outer platforms, each of the shroud caps including a horizontally or circumferentially extending shroud cap base having horizontally or circumferentially spaced apart clockwise and counter-clockwise distal ends, the at least one seal tooth mounted on and extending radially outwardly away from the shroud cap base, clockwise and counter-clockwise facing clockwise and counter-clockwise contact surfaces located at the clockwise and counter-clockwise distal ends respectively, the clockwise and counter-clockwise contact surfaces of circumferentially adjacent ones of the shroud caps contacting each other, the clockwise contact surface being aft facing and the counter-clockwise contact surface being forward facing or the clockwise contact surface being forward facing and the counter-clockwise contact surface being aft facing, and the clockwise and counter-clockwise facing clockwise and counter-clockwise contact surfaces located on horizontally or circumferentially spaced apart clockwise and counter-clockwise side legs at the clockwise and counter-clockwise distal ends respectively of the shroud cap base.

42. The gas turbine engine turbine rotor assembly as claimed in claim 41, further comprising the clockwise and counter-clockwise contact surfaces being flat and angled at clockwise and counter-clockwise angles with respect to a circumferentially extending base centerline of the shroud cap base.

43. The rotor assembly as claimed in claim 41, further comprising:
   circumferentially spaced apart clockwise and counter-clockwise facing shroud side edges of shroud assemblies including the outer platforms and the shroud caps,
   each of the clockwise and counter-clockwise facing shroud side edges including convex and concave portions,
   each axially adjacent pair of the convex and concave portions along the same clockwise or counter-clockwise facing shroud side edges having a common surface portion, and
   the convex portions of the clockwise shroud side edges being complimentary and interlocking with the concave portions of circumferentially adjacent ones of the counter-clockwise facing shroud side edges.

44. The gas turbine engine turbine rotor assembly as claimed in claim 43, further comprising the clockwise contact surface being aft facing and the counter-clockwise contact surface being forward facing or the clockwise contact surface being forward facing and the counter-clockwise contact surface being aft facing.

45. The gas turbine engine turbine rotor assembly as claimed in claim 44, further comprising the clockwise and counter-clockwise contact surfaces being flat and angled at clockwise and counter-clockwise angles with respect to a circumferentially extending base centerline of the shroud cap base.

46. The rotor assembly as claimed in claim 43, further comprising:
   the shroud cap bases disposed in slots of brackets extending radially outwardly from the outer platforms of the tip shrouds,
   the shroud cap bases disposed between radially outwardly extending forward and aft flanges of the brackets, and
   the brackets and the tip shrouds made of the same ceramic material.

47. The rotor assembly as claimed in claim 46, further comprising:
   cylindrical pins disposed through horizontally or circumferentially spaced apart first and second sets of axially aligned holes in the forward and aft flanges and the shroud cap base therebetween,
   the first set of the holes having a circular cross-section,
   circular cross-section holes of the second set of the holes disposed through the forward and aft flanges,
   a non-circular cross-section hole of the second set of the holes disposed through the forward and aft flanges, and
   the non-circular cross-section hole having a cross-sectional racetrack shape with semi-circular horizontally or circumferentially spaced apart first and second ends and a rectangular middle section therebetween.

48. The rotor assembly as claimed in claim 47, further comprising the ceramic material being a ceramic matrix composite.

49. The rotor assembly as claimed in claim 41, further comprising:
   the shroud caps being dual tooth shroud caps and the shroud cap bases being dual tooth shroud cap bases integral or integrally formed with the dual tooth shroud caps,
   wherein the at least one seal tooth comprising axially spaced apart forward and aft seal teeth supported by and extending radially outwardly away from the dual tooth shroud caps,
   the axially spaced apart forward and aft seal teeth extending circumferentially parallel to radially outwardly facing outer shroud surfaces of the outer platforms,
   circumferentially spaced apart clockwise and counter-clockwise shroud side edges of shroud assemblies including the outer platforms and the shroud caps,
   the clockwise and counter-clockwise facing clockwise and counter-clockwise contact surfaces located on horizontally or circumferentially spaced apart clockwise and counter-clockwise side legs at the clockwise and counter-clockwise distal ends respectively of the shroud cap base, and
   the axially spaced apart forward and aft seal teeth being integral with or integrally formed with the dual tooth shroud cap.

50. The rotor assembly as claimed in claim 49, further comprising:
   the dual tooth shroud cap bases rising up or extending radially outwardly from the dual tooth shroud caps,
   horizontally or circumferentially extending elongated rectangular slots located between forward and aft shroud wings of the dual tooth shroud caps,
   the forward and aft shroud wings extending forwardly and aftwardly respectively away from the dual tooth shroud cap bases,
   center flanges integral with the outer platforms and extending radially outwardly from the outer shroud surfaces of the outer platforms, and
   the center flanges extending through the rectangular slots in the dual tooth shroud cap bases.

51. The rotor assembly as claimed in claim 41, further comprising:
   the shroud cap bases disposed between forward and aft half flanges extending radially outwardly from the outer platforms of the tip shrouds,
   a shroud assembly including the outer platform and the shroud cap,
   clockwise and counter-clockwise bridle joints near circumferentially spaced apart clockwise and counter-clockwise facing shroud side edges respectively of the shroud assembly,
   the forward and aft half flanges include mortises of the clockwise and counter-clockwise bridle joints,
   tenons of the clockwise and counter-clockwise bridle joints axially extending from the clockwise and counter-clockwise distal ends of the shroud cap base being received within the mortises, and
   the shroud caps including clockwise and counter-clockwise sections joined along seams therebetween.

52. The rotor assembly as claimed in claim 41, further comprising:
   the at least one seal tooth comprising a single seal tooth extending radially outwardly from each of the shroud cap bases,
   horizontally or circumferentially extending elongated rectangular cavities extending radially outwardly from undersides of and partially through the shroud cap bases, center flanges extending radially outwardly from the outer shroud surfaces of the outer platforms and received within the cavities, and the center flanges integral with the outer platforms.

53. The rotor assembly as claimed in claim 41, further comprising:

the outer platforms being dual tooth outer platforms including the at least one seal tooth, wherein the at least one seal tooth comprises axially spaced forward and aft seal teeth integral with and extending radially outwardly from the dual tooth outer platforms, the shroud cap bases disposed in a slot of brackets extending radially outwardly from the outer platforms of the tip shrouds, the shroud cap bases disposed between forward and aft flanges of the brackets, and the brackets and the tip shrouds made of the same ceramic material.

54. The rotor assembly as claimed in claim 41, further comprising:

the outer platforms including forward and aft sections with slots therebetween, the shroud cap bases at least partially disposed in the slots and extending radially outwardly from the outer platforms of the tip shrouds, shroud assemblies including the outer platforms and the shroud caps, forward and aft corners on the aft and forward sections respectively and bordering the slots therebetween, clockwise and counter-clockwise end lap joints near circumferentially spaced apart clockwise and counter-clockwise facing shroud side edges of the shroud assemblies, one of the forward corners and one of the aft corners each including a platform cheek and a platform shoulder of the clockwise and counter-clockwise end lap joints, the clockwise and counter-clockwise side legs including axially extending clockwise and counter-clockwise flanges respectively, each of the clockwise and counter-clockwise flanges including a shroud cap cheek and a shroud cap shoulder of the clockwise and counter-clockwise end lap joints respectively, the platform cheeks directly contacting and pressed against the shroud cap cheeks of the respective clockwise and counter-clockwise end lap joints, the platform cheeks butting up against the shroud cap shoulders of the respective clockwise and counter-clockwise end lap joints, the shroud cap cheeks butting up against the platform shoulders of the respective clockwise and counter-clockwise end lap joints, and clockwise and counter-clockwise sections joined along seams therebetween.

55. The rotor assembly as claimed in claim 41, further comprising:

forward and aft flanges extending axially forwardly and aftwardly respectively from and oriented perpendicular to the shroud cap bases, forward and aft ceramic flanges extending radially outwardly from and being integral with the outer platforms of the tip shrouds, the forward and aft ceramic flanges oriented perpendicular to the shroud cap bases, and the forward and aft ceramic flanges flush against and parallel to the forward and aft flanges respectively.

56. The rotor assembly as claimed in claim 41, further comprising the clockwise and counter-clockwise contact surfaces of circumferentially adjacent ones of the shroud caps contacting each other with sufficient force to pretwist the turbine blades.

* * * * *

UNITED STATES PATENT AND TRADEMARK OFFICE
CERTIFICATE OF CORRECTION

PATENT NO.        : 9,163,519 B2                                         Page 1 of 1
APPLICATION NO.   : 13/192965
DATED             : October 20, 2015
INVENTOR(S)       : Kleinow et al.

It is certified that error appears in the above-identified patent and that said Letters Patent is hereby corrected as shown below:

In the claims

Column 13, Line 30, Claim 1, delete "facing," and insert -- facing --, therefor.

Column 15, Line 55, Claim 20, delete "claim 17," and insert -- claim 19, --, therefor.

Column 19, Line 34, Claim 38, delete "blade" and insert -- blade assembly --, therefor.

Signed and Sealed this
Twenty-sixth Day of April, 2016

Michelle K. Lee
*Director of the United States Patent and Trademark Office*